United States Patent
Chiang et al.

(10) Patent No.: US 11,200,909 B2
(45) Date of Patent: Dec. 14, 2021

(54) METHOD OF GENERATING ESTIMATED VALUE OF LOCAL INVERSE SPEAKING RATE (ISR) AND DEVICE AND METHOD OF GENERATING PREDICTED VALUE OF LOCAL ISR ACCORDINGLY

(71) Applicant: National Chiao Tung University, Hsinchu (TW)

(72) Inventors: Chen-Yu Chiang, Hsinchu (TW); Guan-Ting Liou, Hsinchu (TW); Yih-Ru Wang, Hsinchu (TW); Sin-Horng Chen, Hsinchu (TW)

(73) Assignee: NATIONAL YANG MING CHIAO TUNG UNIVERSITY, Hsinchu (TW)

( * ) Notice: Subject to any disclaimer, the term of this patent is extended or adjusted under 35 U.S.C. 154(b) by 285 days.

(21) Appl. No.: 16/557,159

(22) Filed: Aug. 30, 2019

(65) Prior Publication Data
US 2021/0035598 A1 Feb. 4, 2021

(30) Foreign Application Priority Data

Jul. 31, 2019 (TW) .................................. 108127279

(51) Int. Cl.
*G10L 25/00* (2013.01)
*G10L 25/48* (2013.01)
(Continued)

(52) U.S. Cl.
CPC .............. *G10L 25/48* (2013.01); *G06N 7/005* (2013.01); *G06N 20/00* (2019.01); *G10L 15/14* (2013.01); *G10L 15/1807* (2013.01)

(58) Field of Classification Search
CPC ... G10L 15/1807; G10L 25/48; G10L 13/033; G10L 15/02; G10L 25/51; G10L 15/14;
(Continued)

(56) References Cited

U.S. PATENT DOCUMENTS 7,263,488 B2 * 8/2007 Chu .................. G10L 13/10
704/251
9,190,051 B2 * 11/2015 Yang ................ G10L 15/08
(Continued)

OTHER PUBLICATIONS

I. Liao, C. Chiang, Y. Wang and S. Chen, "Speaker Adaptation of SR-HPM for Speaking Rate-Controlled Mandarin TTS," in IEEE/ACM Transactions on Audio, Speech, and Language Processing, vol. 24, No. 11, pp. 2046-2058, Nov. 2016, doi: 10.1109/TASLP.2016.2598307. (Year: 2016).*

(Continued)

*Primary Examiner* — Edgar X Guerra-Erazo
(74) *Attorney, Agent, or Firm* — Volpe Koenig

(57) ABSTRACT

A method is disclosed. The proposed method includes: providing an initial speech corpus including plural utterances; based on a condition of maximum a posteriori (MAP), according to respective sequences of syllable duration, syllable duration prosodic state, syllable tone, base-syllable type, and break type of the $k^{th}$ utterance, using a probability of an ISR of the $k^{th}$ utterance $x_k$ to estimate an estimated value $\hat{x}_k$ of the $x_k$; and through the MAP condition, according to respective sequences of syllable duration, syllable duration prosodic state, syllable tone, base-syllable type, and break type of the given $l^{th}$ breath group/prosodic phrase group (BG/PG) of the $k^{th}$ utterance, using a probability of an ISR of the $l^{th}$ BG/PG of the $k^{th}$ utterance $x_{k,l}$ to estimate an estimated value $\hat{x}_{k,l}$ of the $x_{k,l}$ wherein the $\hat{x}_{k,l}$ is the estimated value of local ISR, and a mean of a prior probability model of the $\hat{x}_{k,l}$ is the $\hat{x}_k$.

18 Claims, 6 Drawing Sheets

(51) Int. Cl.
*G10L 15/14* (2006.01)
*G06N 20/00* (2019.01)
*G06N 7/00* (2006.01)
*G10L 15/18* (2013.01)

(58) Field of Classification Search
CPC ..... G10L 15/18; G10L 15/16; G10L 15/1815; G10L 15/1822; G10L 15/187; G10L 15/183; G10L 17/02; G10L 17/04; G10L 17/06; G10L 17/14; G10L 17/18; G10L 17/16; G10L 17/20; G10L 25/00; G10L 25/03; G10L 25/30; G10L 25/27; G10L 25/60; G10L 25/63; G10L 25/69; G10L 25/75; G10L 25/78; G10L 2025/786; G10L 2025/783; G10L 25/90; G10L 2025/935; G06N 20/00; G06N 7/005; G06N 3/08
See application file for complete search history.

(56) References Cited

U.S. PATENT DOCUMENTS

| | | | |
|---|---|---|---|
| 10,192,542 B2* | 1/2019 | Chiang | G10L 15/1807 |
| 2005/0182625 A1* | 8/2005 | Azara | G10L 15/22 |
| | | | 704/236 |
| 2005/0256713 A1* | 11/2005 | Garg | G06K 9/6297 |
| | | | 704/256 |
| 2011/0046958 A1* | 2/2011 | Liu | G10L 17/26 |
| | | | 704/268 |
| 2017/0309271 A1* | 10/2017 | Chiang | G10L 15/1807 |

OTHER PUBLICATIONS

Y. Lin and C. Chiang, "Deep learning-based speaking rate-dependent hierarchical prosodie model for Mandarin TTS," 2017 Asia-Pacific Signal and Information Processing Association Annual Summit and Conference (APSIPA ASC), 2017, pp. 1237-1242, doi: 10.1109/APSIPA.2017.8282228. (Year: 2017).*

C. Chiang, "Cross-Dialect Adaptation Framework for Constructing Prosodic Models for Chinese Dialect Text-to-Speech Systems," in IEEE/ACM Transactions on Audio, Speech, and Language Processing, vol. 26, No. 1, pp. 108-121, Jan. 2018, doi: 10.1109/TASLP.2017.2762432. (Year: 2018).*

Guan-Tin Liou et al., "An Exploration of Local Speaking Rate Variations in Mandarin Read Speech," Interspeech 2018, Sep. 2-6, 2018, Hyderabad, pp. 42-46.

* cited by examiner

METHOD OF GENERATING ESTIMATED VALUE OF LOCAL INVERSE SPEAKING RATE (ISR) AND DEVICE AND METHOD OF GENERATING PREDICTED VALUE OF LOCAL ISR ACCORDINGLY

CROSS-REFERENCES TO RELATED APPLICATIONS

This application claims the benefits of Taiwan Patent Application Number 108127279 filed on Jul. 31, 2019, at the Taiwan Intellectual Property Office, the disclosures of which are incorporated herein in their entirety by reference.

FIELD OF THE INVENTION

The present invention relates to a method of generating an estimated value of a local inverse speaking rate (ISR), in particular to a method of generating an estimated value of a local ISR and apparatus and method for generating a predicted value of the local ISR according to the estimated value obtained by the method.

BACKGROUND OF THE INVENTION

When one looks at the estimation of speaking rate, no matter it is applied to speech recognition, emotion recognition, or text-to-speech system, the conventional methods are all using the average syllable duration or phoneme duration of the whole utterance to engage in the estimation of speaking rate (SR). This kind of conventional method, as well as not considering the prosodic structure, the factors of the text content, the emphasis, the phonetic structure and the emotion, which all influence the SR, are also not considered and thus cannot engage in the exact estimation of the local SR. Due to the drawbacks of the techniques above, the prosodic generation scheme in the text-to-speech system currently can only use the whole utterance to estimate the SR in the training (built-up) stage. Therefore, when the prosody is generated (in the testing stage), the synthesized utterance is generated in fixed SR and cannot present the local variation in the utterance, and it results in the synthesized speech sounding boring. Thus, if the estimation range of the local SR can be systematically defined in the training stage, and the deviation caused by the speech content can be correctly deducted (or normalized), the robust local SR estimation can be done, and after further prosody generation, the utterance synthesized by the text-to-speech system will have the variation of local SR, and it will make the synthesized speech sound more vivid.

Thus, how to make the synthesized utterance have the variance of local SR, and to make the synthesized speech sound more vivid are important aspects for the next development steps in the field.

Keeping the drawbacks of the prior art in mind, and through the use of robust and persistent experiments and research, the applicant has finally conceived of a method of generating estimated value of local inverse speaking rate (ISR) and device and method of generating predicted value of local ISR accordingly.

SUMMARY OF THE INVENTION

It is an objective of the present invention to provide an estimation method of ISR using a hierarchical structure to combine a prosodic module with a prosodic structure to solve the problem when there is an inability to estimate the local ISR of a small region due to the incapability of combining the prosodic structure to provide a reasonable estimation range of SR in the conventional ISR estimation method. Another aim is to provide a clean ISR estimation without being influenced by the text and prosodic structure to solve the problem that the ISR estimation is easily influenced by the bias caused by the SR influence factors. By doing so, the estimation of the ISR will more accurately coincide with the ISR acoustically, and the ISR estimation can be used in the areas of Speech Synthesis, Speech Recognition, and Natural Language Processing as training features, or used in analytical applications.

In accordance with the first aspect of the present invention, a method of generating an estimated value of a local inverse speaking rate (ISR) includes: providing an initial speech corpus including plural utterances, a baseline speaking rate-dependent hierarchical prosodic module (SR-HPM), plural linguistic features corresponding to the plural utterances, plural raw utterance-based ISRs, and plural observed prosodic-acoustic features (PAFs) to train the baseline SR-HPM and to label each the utterance in the initial speech corpus with a prosodic tag having a break type and a prosodic state to obtain a first prosody labeled speech corpus; based on a condition of maximum a posteriori (MAP), according to respective sequences of a syllable duration, a syllable tone, a base-syllable type, and a break type of the $k^{th}$ one of the plural utterances, using a probability of a first ISR of the $k^{th}$ utterance $x_k$ to estimate an estimated value $\hat{x}_k$ of the $x_k$; through the MAP condition, according to respective sequences of a syllable duration, a syllable tone, a base-syllable type, and a break type of an $l^{th}$ breath group/prosodic phrase group (BG/PG) of the $k^{th}$ utterance, using a probability of a second ISR of the $l^{th}$ BG/PG of the $k^{th}$ utterance $x_{k,l}$ to estimate an estimated value $\hat{x}_{k,l}$ of the $x_{k,l}$, wherein the $\hat{x}_{k,l}$ is the estimated value of the local ISR, and a prior probability model of the $\hat{x}_{k,l}$ has a mean being the $\hat{x}_k$; and through the MAP condition, according to respective sequences of a syllable duration, a syllable tone, a base-syllable type, and a break type of an $m^{th}$ prosodic phrase (PPh) of the $l^{th}$ BG/PG of the $k^{th}$ utterance, using a probability of a third ISR of the $m^{th}$ PPh of the $l^{th}$ BG/PG of the $k^{th}$ utterance $x_{k,l,m}$ to estimate an estimated value $\hat{x}_{k,l,m}$ of the $x_{k,l,m}$, wherein the $\hat{x}_{k,l,m}$ is the estimated value of the local ISR, and a prior probability model of the $\hat{x}_{k,l,m}$ has a mean being the $\hat{x}_{k,l}$.

In accordance with the second aspect of the present invention, a method of generating an estimated value of a local inverse speaking rate (ISR) includes: providing an initial speech corpus including plural utterances; based on a condition of maximum a posteriori (MAP), according to respective sequences of a syllable duration, a syllable tone, a base-syllable type, and a break type of the $k^{th}$ one of the plural utterances, using a probability of a first ISR of the $k^{th}$ utterance $x_k$ to estimate an estimated value $\hat{x}_k$ of the $x_k$; through the MAP condition, according to respective sequences of a syllable duration, a syllable tone, a base-syllable type, and a break type of the $l^{th}$ breath group/ prosodic phrase group (BG/PG) of the $k^{th}$ utterance, using a probability of a second ISR of the $l^{th}$ BG/PG of the $k^{th}$ utterance $x_{k,l}$ to estimate an estimated value $\hat{x}_{k,l}$ of the $x_{k,l}$, wherein the $\hat{x}_{k,l}$ is the estimated value of the local ISR, and a prior probability model of the $\hat{x}_{k,l}$ has a mean being the $\hat{x}_k$; and through the MAP condition, according to respective sequences of a syllable duration, a syllable tone, a base-syllable type, and a break type of the $m^{th}$ prosodic phrase (PPh) of the $l^{th}$ BG/PG of the $k^{th}$ utterance, using a probability of a third ISR of the $m^{th}$ PPh of the $l^{th}$ BG/PG of the $k^{th}$ utterance $x_{k,l,m}$ to estimate an estimated value $\hat{x}_{k,l,m}$ of the $x_{k,l,m}$, wherein the $\hat{x}_{k,l,m}$ is the estimated value of the local ISR, and a prior probability model of the $\hat{x}_{k,l,m}$ has a mean being the $\hat{x}_{k,l}$.

In accordance with the third aspect of the present invention, a method of generating an estimated value of local inverse speaking rate (ISR) includes: providing an initial speech corpus including plural utterances; based on a condition of maximum a posteriori (MAP), according to respective sequences of a syllable duration, a syllable tone, a base-syllable type, and a break type of the $k^{th}$ one of the plural utterances, using a probability of a first ISR of the $k^{th}$ utterance $x_k$ to estimate an estimated value $\hat{x}_k$ of the $x_k$; and through the MAP condition, according to respective sequences of a syllable duration, a syllable tone, a base-syllable type, and a break type of the $l^{th}$ breath group/prosodic phrase group (BG/PG) of the $k^{th}$ utterance, using a probability of a second ISR of the $l^{th}$ BG/PG of the $k^{th}$ utterance $x_{k,l}$ to estimate an estimated value $\hat{x}_{k,l}$ of the $x_{k,l}$, wherein the $\hat{x}_{k,l}$ is the estimated value of the local ISR, and a prior probability model of the $\hat{x}_{k,l}$ has a mean being the $\hat{x}_k$.

BRIEF DESCRIPTION OF THE DRAWINGS

Other objectives, advantages and the efficacy of the present invention will be described in detail below taken from the preferred embodiments with reference to the accompanying drawings, in which.

DETAILED DESCRIPTION OF THE PREFERRED EMBODIMENT

The present invention will now be described more specifically with reference to the following embodiments. It is to be noted that the following descriptions of the preferred embodiments of this invention are presented herein for purposes of illustration and description only; they are not intended to be exhaustive or to be limited to the precise form disclosed.

An estimation method of local inverse SR is provided in the present invention. Based on the existing speaking rate-dependent hierarchical prosodic module (SR-HPM), a large amount of training corpus is analyzed via the existing SR-HPM to extract the prosodic structure therein, and to estimate features in each the prosodic phrase (PPh) such as the ISR, the prosodic state, the tone influence factor and the syllable type influence factor to assist the local SR estimation. The removal of these influence factors can cause the estimation of the SR to be free from the influence of bias, and can make the estimated SR match with the SR sensing and the reasonable segment unit related to the prosodic structure can engage in the estimation of the SR. Using the reasonable segment unit can make the estimation of SR match with the variation of human speaking rate and it will be engaged in a prosodic range rather than varied randomly, and provide a unit to estimate the reasonable SR. Finally, a hierarchical ISR estimation module is built up to engage in the local SR estimation method, which can stabilize the local ISR estimation via the estimated results of ISR in a wide range of the upper level. The method proposed in the present invention is mainly aimed at solving the inability to estimate local ISR of the conventional ISR estimation method due to the reasonable SR estimation segment not being defined, improving the bias problem of SR estimation caused by the lack of consideration of the influences of content of the text and the prosodic structure in the conventional ISR estimation method, causing the estimation of ISR to further approach the SR variation of actual voice, solving the bias problem of the ISR estimation, and proposing a local ISR estimation method using the prosodic information as features.

Figure 1A:
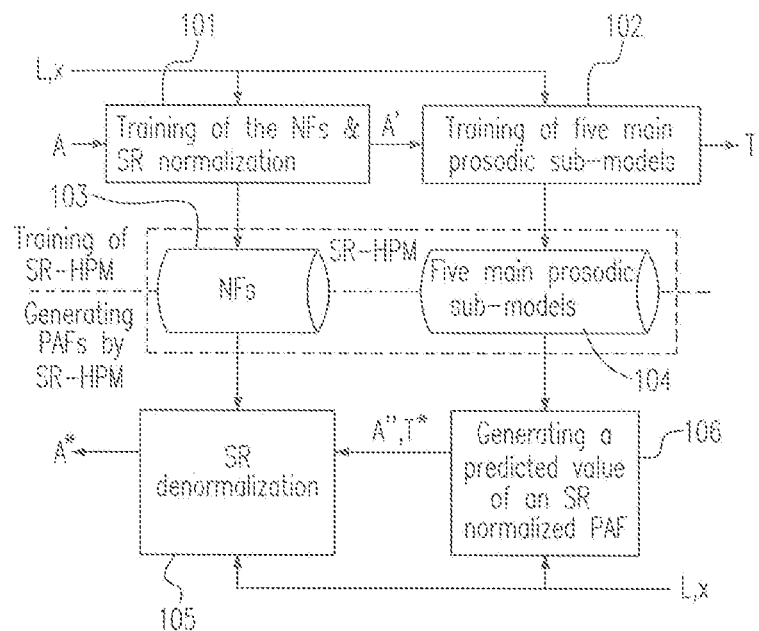
FIG. 1(a) is a relationship diagram of normalized functions and five main prosodic sub-models according to the preferred embodiment of the present invention.

FIG. 1(a) shows a relationship diagram of normalized functions and five main prosodic sub-models according to the preferred embodiment of the present invention. In FIG. 1(a), it includes Training of the NFs & SR normalization 101, Training of five main prosodic sub-models 102, NFs 103, Five main prosodic sub-models 104, SR denormalization 105, and Generating a predicted value of an SR normalized PAF 106, where NFs are the normalized functions, and a PAF is a prosodic-acoustic feature.

As shown in FIG. 1(a), the SR-HPM is mainly divided into two parts, one is the NFs 103, and the other is the Five main prosodic sub-models 104. The relationship between the NFs 103 and the Five main prosodic sub-models 104, the features used in the training and the prosody generation structure are shown in FIG. 1(a), and it can be divided into two phases of "Training of SR-HPM" and "Generating PAFs by SR-HPM". NFs 103 are mainly engaged in the normalization of the observed prosodic-acoustic features (PAFs) A of plural utterances to remove the influences of SR, and to compensate the influences of SR towards the statistical data. NFs 103 are trained by the linguistic features related to the text L, the observed PAFs A and local ISR x. The normalization of the PAFs A is engaged via the NFs 103. After the removal of the influences of SR, SR normalized PAFs A' are obtained. Due to the fact that A' is not influenced by the SR and can make all the information located at the same level, the following Training of five main prosodic sub-models 102 is made even simpler. The training of five main prosodic sub-models 102 will generate the prosodic tag T tagged to the prosodic structure. Five main prosodic sub-models 104 are used for Generating a predicted value of an SR normalized PAF 106 so as to further generate the predicted values of the SR normalized PAFs A" and the predicted prosodic tag T*. NFs 103 can be used in SR denormalization 105 and also can be engaged in the denormalization of the SR normalized PAFs A" and the predicted prosodic tag T* so as to generate the synthesized PAFs A* of the target SR. Five main prosodic sub-models 104 are trained by the SR normalized PAFs A', the linguistic features L and the local ISR x.

Figure 1B:
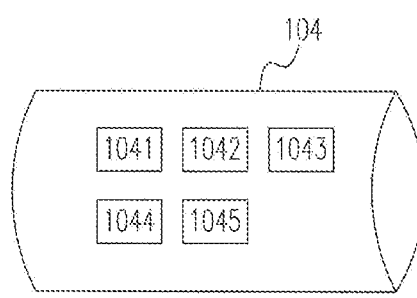
FIG. 1(b) is a schematic diagram of the five main prosodic sub-models as shown in FIG. 1(a).

FIG. 1(b) shows a schematic diagram of the five main prosodic sub-models as shown in FIG. 1(a). As shown in FIG. 1(b), the five main prosodic sub-models include a break-syntax sub-model 1041, a prosodic state sub-model 1042, a syllable prosodic-acoustic feature sub-model 1043, a break-acoustic sub-model 1044 and a prosodic state-syntax sub-model 1045.

The structure of local ISR estimation.

Figure 2:
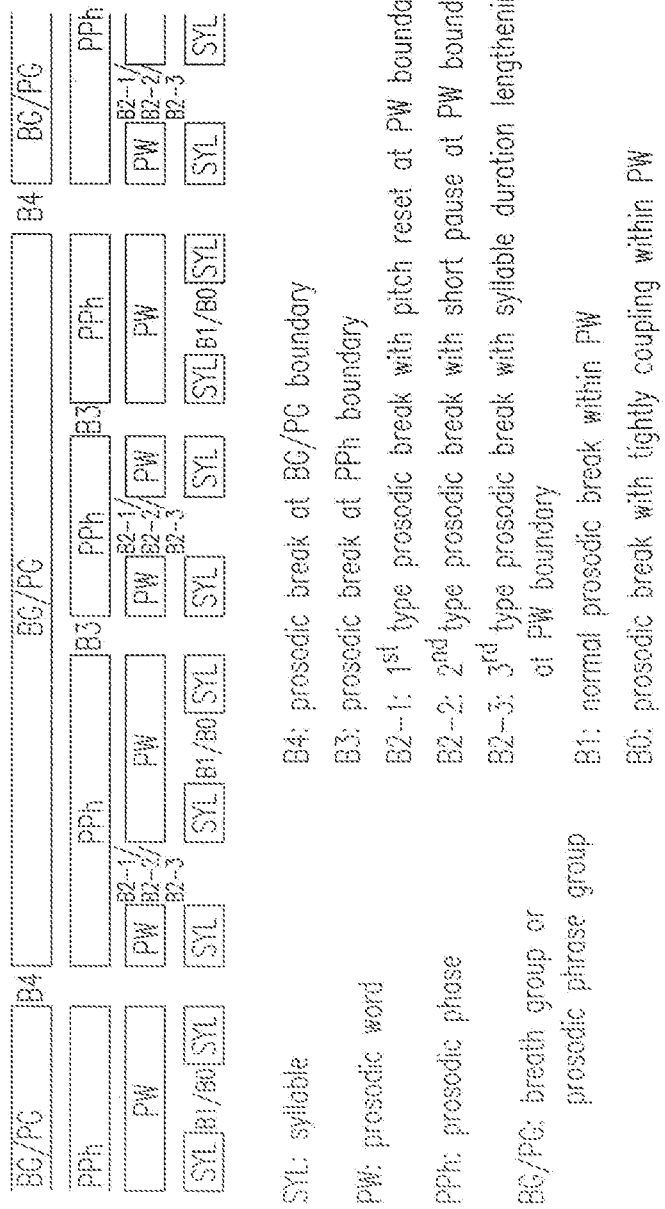
FIG. 2 is a schematic diagram of a four-layer prosodic structure according to the preferred embodiment of the present invention.

The present invention proposes a method of estimating a local ISR using a four-layer prosodic structure. FIG. 2 shows a schematic diagram of a four-layer prosodic structure according to the preferred embodiment of the present invention. In FIG. 2, an utterance is constituted by a breath group/prosodic phrase group (BG/PG) or several BG/PGs. Each BG/PG is composed by a single PPh or several PPhs and its end usually has a obvious long pause, and the PPh layer is composed by one or more Prosodic Words (PWs) and its end usually has a medium-length pause, the PW layer is composed by multi-syllable words, usually are closely related in syntax and semantic meaning, and the bottom layer is the syllable (SYL) layer, which is the most basic literal meaning of Chinese. The prosodic variation of an utterance will be influenced by these four prosodic layers. Actually, the fast and slow change of an utterance will be influenced by basic SR except for the influence of the prosodic structure. Therefore, using this four-layer prosodic structure can provide a reasonable SR estimation interval through the cooperation of the four-layer prosodic structure, and set up a local ISR estimation by combining the four-layer prosodic structure. This method can avoid the situation when the estimation interval is determined simply by the text or the voice signal, and this will result in the circumstances where the voice signal and the estimation interval cannot cooperate with each other.

In the present invention, the reason that the SR estimation method does not use the SR (syllable/second) and use the ISR (second/syllable) instead is because the ISR is more convenient to be used as the PAF of Text-to-Speech (TTS) applications. Here, the PPh is used as the segment unit of the estimation for example, engages in the estimation of the local ISR, through the SR-HPM, a large amount of training corpus is analyzed to extract the prosodic structure therein, and each the ISR in all the PPhs is estimated so as to allow the SR-HPM to further reinforce the robustness of the module.

Figure 3:
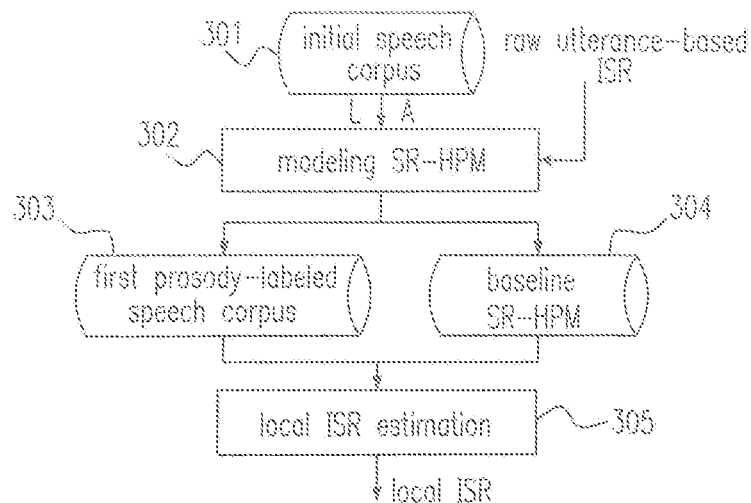
FIG. 3 is a flow chart of a local ISR estimation method according to the preferred embodiment of the present invention.

FIG. 3 shows a flow chart of a local ISR estimation method according to the preferred embodiment of the present invention. In FIG. 3, it includes initial speech corpus 301, modeling SR-HPM 302, first prosody-labeled speech corpus 303, baseline SR-HPM 304, and local ISR estimation 305 so as to generate the local ISR. At first, the initial corpus 301 is used to provide linguistic features L and observed PAFs A for modeling SR-HPM 302, wherein the estimated utterance-based ISR is used as the raw utterance-based ISR. This raw utterance-based ISR is used as an independent variable for modeling SR-HPM 302, and at the same time, this step labels all the text in the initial speech corpus 301 with the prosodic tag having the break type and the prosodic state to obtain the first prosody-labeled speech corpus 303. These prosodic tags label the four-layer prosodic structure corresponding to each the utterance. Then, based on the MAP condition, the four-layer prosodic structure is used to estimate all the local ISRs in the speech corpus.

The details of the proposed system will be described as follows, and as shown in FIG. 3, this system includes the following two steps:

1. Training a baseline SR-HPM 304 and labeling the initial speech corpus 301 with the prosodic tag having the break type and the prosodic state to obtain the first prosody-labeled speech corpus 303; and
2. Estimating the local SR 305.

In the first step (referring to FIG. 1(a)), at first, linguistic features L and raw utterance-based ISR are used for Training of the NFs 101 and the NFs 103 is used to engage in the SR normalization towards the observed PAFs to obtain the SR normalized PAFs A'. Then, the Prosody Labeling and Modeling (PLM) algorithm is used for modeling SR-HPM 302 and labeling all the utterances with the prosodic tag having the break type and the prosodic state to obtain the prosodic tag T={B, P}. Tag B indicates a break type sequence and is composed by 7 break types {B0, B1, B2-1, B2-2, B2-3, B3, B4} to construct the utterances into the four-layer prosodic structure as shown in FIG. 2. Tag P={p, q, r} are three prosodic state sequences that respectively represent the pitch contour level, the syllable duration and the energy level states of the current syllable above the SYL layer of the prosodic structure (that is, commonly hold by PW, PPh and BG/PG). In the present invention, the information of the prosodic state is used to estimate the influence of the four-layer prosodic structure towards the observed syllable duration, and then the local ISR can be estimated more accurately.

In the second step, the PPh ISRs are estimated to be based on the MAP condition, and that is, the local ISRs defined by the present invention. Assume that this local ISR (PPh ISR) is an ISR deviated from the prosodic units of the upper layer (utterance or BG/PB). Intuitively, an ISR of the PPh can be estimated by the mean syllable duration of all the syllables in a PPh, and the ISR estimated by this simple method is named a raw local ISR. However, the number of syllables in a PPh is usually a small quantity, so it is easy to result in inaccuracies of the ISR estimation. Thus, the raw utterance-based ISR relatively cannot represent the actual ISR. Therefore, the present invention provides a hierarchical MAP estimation method to sequentially estimate the local ISR from the highest layer to the bottom layer to make sure the difference between the estimated ISR and the ISR of the prosodic unit (utterance or BG/PG) of the upper layer won't be too much. This method also considered the syllable tone, the base-syllable type and the prosodic structure found by the baseline SR-HPM to curb the deviation amount of the estimation.

Figure 4:
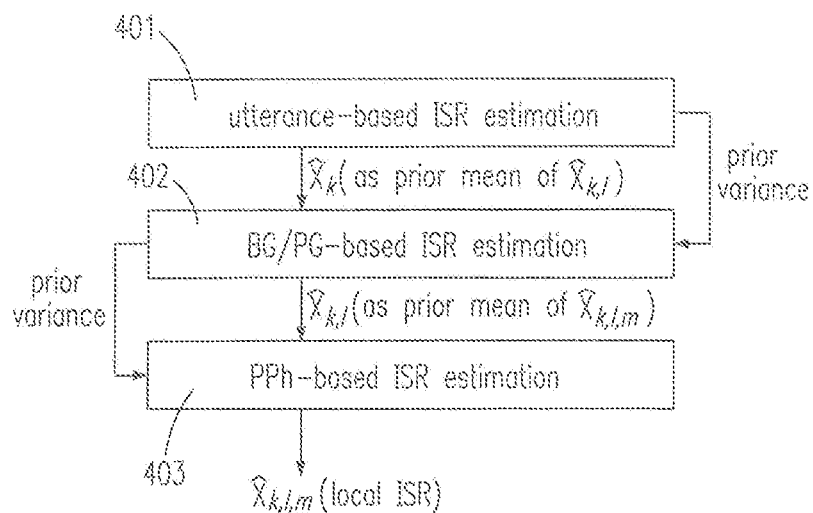
FIG. 4 is a schematic diagram of an estimation method of local ISR based on a condition of maximum a posteriori (MAP) according to the preferred embodiment of the present invention.

FIG. 4 shows a schematic diagram of an estimation method of local ISR based on a condition of MAP according to the preferred embodiment of the present invention. In FIG. 4, it includes utterance-based ISR estimation 401, BG/PG-based ISR estimation 402 and PPh-based ISR estimation 403. As shown in FIG. 4, the whole sequential estimation method is briefly described: At first, the ISR of the $k^{th}$ utterance, that is estimated $\hat{x}_k$, or named utterance-based ISR estimation 401. After that, the $l^{th}$ BG/PG of the $k^{th}$ utterance is estimated, that is $x_{k,l}$, or named BG/PG-based estimation 402. This estimation estimates the BG/PG-based ISR through the MAP condition, we assumed that its prior probability model is a Gaussian distribution, a mean of a prior probability model of the $\hat{x}_{k,l}$ is set to be $\hat{x}_k$, and a variation of a prior probability model of the Gaussian distribution is set to be a statistical variance of raw BG/PG-based ISRs of plural BG/PG included in C utterances. A selection condition of the C utterances is that the C utterances are the C utterances having the utterance-based ISRs being the closest ones to the $\hat{x}_k$ in the first prosody-labeled speech corpus. Finally, the ISR of the $m^{th}$ PPh ISR of the $l^{th}$ Bg/PG of the $k^{th}$ utterance is estimated, that is $\hat{x}_{k,l,m}$, named PPh ISR or local ISR estimation 403, is also estimated by using the MAP condition, we assumed that its prior probability model is a Gaussian distribution, a mean of a prior probability model of the Gaussian distribution is the BG/PG ISR estimated previously by MAP condition, $\hat{x}_{k,l}$, and a variance of the prior probability model of the Gaussian distribution is set to be a statistical variance of raw PPh-based ISRs of plural PPhs included in D BG/PGs. A selection condition of the D BG/PGs is that the D BG/PGs are the D BG/PGs having the BG/PG-based ISRs being the closest ones to the $\hat{x}_{k,l}$ in the first prosody-labeled speech corpus. The applied mathematical formulas in detail are described as follows.

Estimation Method of the Local ISR

Here, the utterance-based ISR $\hat{x}_k$ is estimated first, then the statistical data of $\hat{x}_k$ is used as the prior probability to assist the estimation of the BG/PG-based ISR $\hat{x}_{k,l}$. Finally, the statistical data of $\hat{x}_{k,l}$ is used as the prior probability to assist the estimation of the BG/PG-based ISR, which is the local ISR of the present invention $\hat{x}_{k,l,m}$, and the proposed method is described in detail sequentially.

1. Estimation of Utterance-Based ISR $\hat{x}_k$

We assume that the prior probability density function is a Gaussian distribution, and thus the maximum likelihood condition and the following mathematical formula are used to estimate the utterance-based ISR $\hat{x}_k$:

$$\hat{x}_k = \underset{x_k}{\mathrm{argmax}}\, p(x_k \mid sd_k, t_k, s_k, B_k) \qquad (1)$$

$$= \underset{x_k}{\mathrm{argmax}} [p(x_k, sd_k \mid t_k, s_k, B_k)/p(sd_k \mid t_k, s_k B_k)]$$

$$= \underset{x_k}{\mathrm{argmax}} [p(sd_k \mid x_k, t_k, s_k, B_k)$$

$$p(x_k \mid t_k, s_k, B_k)/p(sd_k \mid t_k, s_k, B_k)]$$

$$= \underset{x_k}{\mathrm{argmax}} [p(sd_k \mid x_k, t_k, s_k, B_k) p(x_k \mid t_k, s_k, B_k)]$$

$$\approx \underset{x_k}{\mathrm{argmax}} [p(sd_k \mid x_k, t_k, s_k, B_k) p(x_k)]$$

$$\approx \underset{x_k}{\mathrm{argmax}}\, p(sd_k \mid x_k, t_k, s_k, B_k),$$

where $sd_k = \{sd_{k,n}\}_{n=1 \sim N_k}$, $t_k = \{t_{k,n}\}_{n=1 \sim N_k}$, $s_k = \{s_{k,n}\}_{n=1 \sim N_k}$, $B_k = \{B_{k,n}\}_{n=1 \sim N_k}$ are respective sequences of syllable duration, syllable tone, base-syllable type, and break type of the $k^{th}$ utterance; n is the syllable index; N is the number of syllables of the BG/PG. The probability $p(sd_k|x_k,t_k,s_k,B_k)$ is the likelihood function describing the probability distribution of $sd_k$. Based on the superposition assumption that the syllable duration is the affecting pattern (AP) of SR, syllable tone, base-syllable type and syllable duration prosodic state, the syllable duration can be expressed as follows:

$$sd_{k,n} = sd_{k,n}' + \gamma_{t_{k,n}} + \gamma_{s_{k,n}} + \gamma_{q_{k,n}} + x_k \qquad (2)$$

where $\gamma_{t_{k,n}}$, $\gamma_{s_{k,n}}$ and $\gamma_{q_{k,n}}$ are respective APs of syllable tone $t_{k,n}$, base syllable type $s_{k,n}$ and syllable duration prosodic state $q_{k,n}$; $sd_{k,n}'$ is the modeling residual of a Gaussian distribution model having a mean value of 0. Note that the syllable duration prosodic state $q_{k,n}$ is not in the likelihood function (1). Therefore, it is considered as a hidden variable, and is influenced by the break type sequence $B_k$. Thus, the Expectation-Maximization algorithm (EM algorithm) is introduced to solve Eq. (1). And, that is:

$$\hat{x}_k = \underset{x_k}{\mathrm{argmax}} \sum_{q_k} p(q_k \mid sd_k, x_k', t_k, s_k, B_k) \ln[p(sd_k \mid q_k, x_k, t_k, s_k, B_k)], \qquad (3)$$

where $p(q_k|sd_k,x_k',t_k,s_k,B_k)$ represents the posterior probability of syllable duration prosodic state $q_k = \{q_{k,n}\}_{n=1 \sim N_k}$; $x_k'$ is the old estimation of the utterance-based ISR; $p(sd_k|q_k,x_k, t_k,s_k,B_k)$ is the likelihood function as shown in Eq. (4):

$$p(sd_k \mid q_k, x_k, t_k, s_k, B_k) \approx p(sd_k \mid q_k, x_k, t_k, s_k) =$$
$$\Pi_{n=1}^{N_k} p(sd_{k,n} \mid q_{k,n}, x_k, t_{k,n}, s_{k,n}) =$$
$$\Pi_{n=1}^{N_k} N(sd_{k,n} \mid \gamma_{t_{k,n}} + \gamma_{s_{k,n}} + \gamma_{q_{k,n}} + x_k, v) \qquad (4)$$

To simplify the Eq., assume that the syllable duration prosodic state is only related to the break type sequence $B_k$ which labels the prosodic structure, and the prior probability can be simplified as:

$$p(q_k \mid sd_k, x_k', t_k, s_k, B_k) \approx p(q_k \mid B_k) = \Pi_{n=1}^{N_k} p(q_{k,n} \mid B_k) \qquad (5)$$

where probability $p(q_{k,n}|B_k)$ can be estimated through the probability $p(q_{k,n}|q_{k,n-1},B_{k,n-1},B_{k,n})$ by using the forward-backward algorithm. APs $\gamma_{t_{k,n}}$, $\gamma_{s_{k,n}}$ and $\gamma_{q_{k,n}}$ etc. and probability $p(q_{k,n}|q_{k,n-1},B_{k,n-1},B_{k,n})$ can be acquired by using the labeled break type sequence and the prosodic state sequence of the baseline SR-HPM.

2. Estimation of the BG/PG-Based ISR $\hat{x}_{k,l}$,

Next, the BG/PG-based ISR of the $l^{th}$ BG/PG of the $k^{th}$ utterance, $x_{k,l}$ is estimated, where $\hat{x}_{k,l}$ is derived by using a probability of an ISR of the $k^{th}$ utterance $\hat{x}_k$ as a mean of a prior probability to estimate an estimated value of the BG/PG-based ISR of the $l^{th}$ BG/PG of the $k^{th}$ utterance, $x_{k,l}$, is estimated. Its mathematical eq. can be expressed as:

$$\hat{x}_{k,l} = \underset{x_{k,l}}{\mathrm{argmax}}\, p(x_{k,l} \mid sd_{k,l}, t_{k,l}, s_{k,l}, B_{k,l}) = \qquad (6)$$

$$\underset{x_{k,l}}{\mathrm{argmax}}\, p(sd_{k,l} \mid x_{k,l}, t_{k,l}, s_{k,l}, B_{k,l}) p(x_{k,l}),$$

where $sd_{k,l} = \{sd_{k,l,n}\}_{n=1 \sim N_{k,l}}$, $t_{k,l} = \{t_{k,l,n}\}_{n=1 \sim N_{k,l}}$, $s_{k,l} = \{s_{k,l,n}\}_{n=1 \sim N_{k,l}}$, $B_{k,l} = \{B_{k,l,n}\}_{n=1 \sim N_{k,l}}$ are respective sequences of syllable duration, syllable tone, base-syllable type, and break type of the $l^{th}$ BG/PG of the $k^{th}$ utterance; n is the syllable index; $N_{k,l}$ is the number of syllables of the $l^{th}$ BG/PG of the $k^{th}$ utterance. The probability $p(sd_{k,l}|x_{k,l},t_{k,l},s_{k,l},B_{k,l})$ is the likelihood function describing the probability distribution of the syllable duration sequence $sd_{k,l}$, given the BG/PG-based ISR $\hat{x}_{k,l}$, syllable tone, base-syllable type and break type. The same as the acquired utterance-based ISR, we assume that based on the superposition assumption, the syllable duration is the affecting pattern (AP) of SR, syllable tone, base-syllable type and syllable duration prosodic state. The syllable duration can be expressed as follows:

$$sd_{k,l,n} = sd_{k,l,n}' + \gamma_{t_{k,l,n}} + \gamma_{s_{k,l,n}} + \gamma_{q_{k,l,n}} + x_{k,l} \qquad (7)$$

where $\gamma_{t_{k,l,n}}$, $\gamma_{s_{k,l,n}}$ and $\gamma_{q_{k,l,n}}$ are respective APs of syllable tone $t_{k,l,n}$, base syllable type $s_{k,l,n}$ and syllable duration prosodic state $q_{k,l,n}$; $sd_{k,l,n}'$ is the modeling residual of a Gaussian distribution model having a mean value of 0. Note that the syllable duration prosodic state $\gamma_{q_{k,l,n}}$ is considered as a hidden variable, and is influenced by the break type sequence $B_{k,l}$. Thus, the Expectation-Maximization algorithm (EM algorithm) is introduced to solve Eq. (6). And, that is:

$$\hat{x}_{k,l} = \underset{x_{k,l}}{\mathrm{argmax}} \sum_{q_{k,l}} p(q_{k,l} \mid sd_{k,l}, x_{k,l}', t_{k,l}, s_{k,l}, B_{k,l}) = \qquad (8)$$

$$\ln[p(sd_{k,l} \mid q_{k,l}, x_{k,l}, t_{k,l}, s_{k,l}, B_{k,l}) p(x_{k,l})],$$

were $p(q_{k,l}|sd_{k,l},x_{k,l}',t_{k,l},s_{k,l},B_{k,l})$ represents the posterior probability of prosodic state; it is also assume that the syllable duration prosodic state is only related to the break type sequence which labels the prosodic structure, and the prior probability can be simplified as:

$$p(q_{k,l} \mid sd_{k,l}, x_{k,l}', t_{k,l}, s_{k,l}, B_{k,l}) \approx \Pi_{n=1}^{N_{k,l}} p(q_{k,l,n} \mid B_{k,l}) \qquad (9)$$

$p(sd_{k,l}|q_{k,l},x_{k,l},t_{k,l},s_{k,l},B_{k,l})$ is the likelihood function as shown in Eq. (10):

$$p(sd_{k,l}|q_{k,l},x_{k,l},t_{k,l},s_{k,l},B_{k,l}) \approx \prod_{n=1}^{N_{k,l}} N(sd_{k,l,n}|\gamma_{t_{k,l,n}}+\gamma_{s_{k,l,n}}+\gamma_{q_{k,l,n}}+x_{k,l},v) \quad (10)$$

where probability $p(q_{k,l,n}|B_{k,l})$ can be estimated through the probability $p(q_{k,l,n}|q_{k,l,n-1},B_{k,l,n-1},B_{k,l,n})$ by using the forward-backward algorithm. APs $\gamma_{t_{k,l,n}}$, $\gamma_{t_{k,l,n}}$, $\gamma_{s_{k,l,n}}$ and $\gamma_{q_{k,l,n}}$ etc. and probability $p(q_{k,l,n}|q_{k,l,n-1},B_{k,l,n-1},B_{k,l,n})$ can be acquired by using the labeled break type sequence and the prosodic state sequence of the baseline SR-HPM.

The prior probability $p(x_{k,l})$ is a Gaussian distribution, that is $x_{k,l} \sim N(\hat{x}_k,v_{x_k})$, where $\hat{x}_k$ is the utterance-based ISR, estimated by the mathematical Eq. (3) and using the EM algorithm, and is a mean of this prior probability. $v_{x_k}$ is the variance of this prior probability, and is acquired by the following Eq. (11)-Eq. (13).

$$v_{x_k} = \frac{\sum_{c=1}^{C}\sum_{l=1}^{N_{k_c}}(x'_{k_c,l}-\bar{x})^2}{\sum_{c=1}^{C} N_{k_c}}, \text{ where} \quad (11)$$

$$\bar{x} = \frac{\sum_{c=1}^{C}\sum_{l=1}^{N_{k_c}} x'_{k_c,l}}{\sum_{c=1}^{C} N_{k_c}} \quad (12)$$

$$x'_{k_c,l} = \frac{\sum_{n=1}^{N_{k_c,l}} sd_{k,l,n}}{N_{k_c,l}} \quad (13)$$

$k_c$ represents the $c_{th}$ smallest utterance index having a difference $(|\hat{x}_k - \hat{x}_{k_c}|)$ with the utterance-based ISR $\hat{x}_k$, and $x_{k_c,l}'$ represents raw BG/PG-based ISR of the $l^{th}$ BG/PG of the $k_c$ utterance in Eq. (13), thus Eq. (11) represents a statistical variance of raw BG/PG-based ISRs of plural BG/PG included in C utterances. A selection condition of the C utterances is that the C utterances are the C utterances having the utterance-based ISRs being the C closest ones to the $\hat{x}_k$ in the speech corpus.

3. Estimation Local/PPh-Based ISR $\hat{x}_{k,l,m}$

Next, the local/PPh-based ISR is estimated via the MAP condition, the BG/PG-based ISR of $l^{th}$ BG/PG of the $k^{th}$ utterance is used as the prior probability to estimate the PPh-based ISR of the $m^{th}$ PPh of the $l^{th}$ BG/PG of the $k^{th}$ utterance, $\hat{x}_{k,l,m}$. Similar to the estimation method of BG/PG-based ISR $\hat{x}_{k,l}$, the mathematical Eq. of the estimation of $\hat{x}_{k,l}$ can be expressed as:

$$\hat{x}_{k,l,m} = \underset{x_{k,l,m}}{\arg\max}\, p(x_{k,l,m}|sd_{k,l,m}, t_{k,l,m}, s_{k,l,m}, B_{k,l,m}) = \underset{x_{k,l,m}}{\arg\max}\, p(sd_{k,l,m}|x_{k,l,m}, t_{k,l,m}, s_{k,l,m}, B_{k,l,m})p(x_{k,l,m}), \quad (14)$$

where $sd_{k,l,m}=\{sd_{k,l,m,n}\}_{n=1 \sim N_{k,l,m}}$, $t_{k,l,m}=\{t_{k,l,m,n}\}_{n=1 \sim N_{k,l,m}}$, $s_{k,l,m}=\{s_{k,l,m,n}\}_{n=1 \sim N_{k,l,m}}$, $B_{k,l,m}=\{B_{k,l,m,n}\}_{n=1 \sim N_{k,l,m}}$ are respective sequences of syllable duration, syllable tone, base-syllable type, and break type of the $m^{th}$ PPh of the $l^{th}$ BG/PG of the $k^{th}$ utterance, n is the syllable index, $N_{k,l,m}$ is the number of syllables of the $m^{th}$ PPh of the $l^{th}$ BG/PG of the $k^{th}$ utterance. The estimation of the $\hat{x}_{k,l,m}$ in Eq. (14) is the same as that of $\hat{x}_{k,l}$ using the EM algorithm estimation method, where the prior probability $p(x_{k,l,m})$ is a Gaussian distribution, that is $x_{k,l,m} \sim N(\hat{x}_{k,l}, v_{x_{k,l}})$, where $\hat{x}_{k,l}$ is the BG/PG-based ISR, estimated by the mathematical Eq. (8) and using the EM algorithm, and is a mean of this prior probability. $v_{x_{k,l}}$ is the variance of this prior probability, and is acquired by the following Eq. (15)-Eq. (17).

$$v_{x_{k,l}} = \frac{\sum_{d=1}^{D}\sum_{m=1}^{N_{k^{(l_d)},l_d}}\left(x'_{k^{(l_d)},l_d,m}-\tilde{x}\right)^2}{\sum_{d=1}^{D} N_{k^{(l_d)},l_d}}, \text{ where} \quad (15)$$

$$\tilde{x} = \frac{\sum_{d=1}^{D}\sum_{m=1}^{N_{k^{(l_d)},l_d}} x'_{k^{(l_d)},l_d,m}}{\sum_{d=1}^{D} N_{k^{(l_d)},l_d}} \quad (16)$$

$$x'_{k^{(l_d)},l_d,m} = \frac{\sum_{n=1}^{N_{k^{(l_d)},l_d,m}} sd_{k,l,m,n}}{N_{k^{(l_d)},l_d,m}} \quad (17)$$

$\{k^{(l_d)},l_d\}$ represents the $d_{th}$ smallest utterance index having a difference $$\left(\left|\hat{x}_{k,l} - \hat{x}_{k^{(l_d)},l_d}\right|\right)$$

with the BG/PG-based ISR, $\hat{x}_{k,l}$, and that is the $l_d$ BG/PG of the $k^{(l_d)}$ utterance. In the mathematical Eq. (17), $$x'_{k^{(l_d)},l_d,m}$$

represents the raw PPh-based ISR of $m^{th}$ PPh ISR of the $l_d$ BG/PG of the $k^{(l_d)}$ utterance. Thus, Eq. (15) represents a statistical variance of plural PPhs included in D BG/PG of raw PPh-based ISRs. Thus, the selection condition of these D BG/PGs is that these D BG/PGs are the D closest ones to the $\hat{x}_{k,l}$ of the BG/DG-based ISRs in the speech corpus.

Embodiments of Local ISR

Figure 5A:
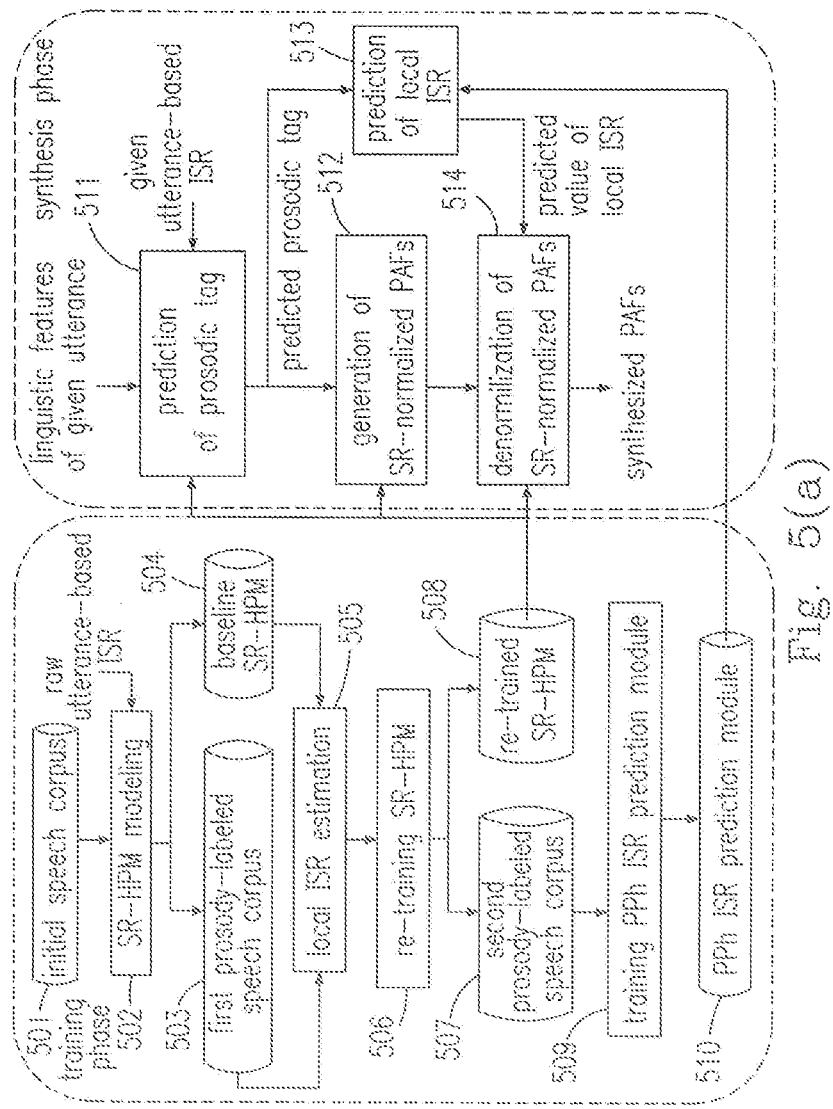
FIG. 5(a) is a flow chart of an integral experiment according to the preferred embodiment of the present invention.

FIG. 5(a) shows a flow chart of an integral experiment according to the preferred embodiment of the present invention. As shown in FIG. 5(a), the flow chart of the integral experiment can be divided into the training phase and the synthesis phase. In FIG. 5(a), the training phase includes initial speech corpus 501, SR-HPM modeling 502, first prosody-labeled speech corpus 503, baseline SR-HPM 504, local ISR estimation 505, re-training SR-HPM 506, second prosody-labeled speech corpus 507, re-trained SR-HPM 508, training PPh ISR prediction module 509 and PPh ISR prediction module 510; and the synthesis phase includes prediction of prosodic tag 511, generation of SR-normalized PAFs 512, prediction of local ISR 513 and denormalization of SR-normalized PAFs 514.

Regarding the training phase, as shown in FIG. 5(a), an initial speech corpus 501 is provided first, then the conventional SR-HPM modeling method is used and the raw utterance-based ISRs is inputted as the SRs for the SR-HPM modeling 502, and these ISRs, the linguistic features and the observed PAFs are used to train the baseline SR-HPM 504. In the meantime, all the text in the initial speech corpus are labeled with a prosodic tag having a break type and a prosodic state to generate a first prosody-labeled speech corpus 503. These prosodic tags label each of the utterances with the four-layer prosodic structure as shown in FIG. 2. Using raw utterance-based ISR as ISR for SR-HPM modeling 502 above, it is assumed that the whole utterance is using the same ISR to control its prosodic variation. Next, the estimation method of the local ISR of the present invention is used to engage in the local ISR estimation 505, that is to say the eq. (1) (6) and (14) are used to estimate the utterance-based, BG/PG-based, and PPh-based ISRs. After that, the estimated PPh-based ISRs are used for re-training SR-HPM 506. In the training phase, the NFs used to curb the influences of the change of SR towards PAFs will be re-trained, and will be applied to each the local PPh to engage in the SR normalization of the PAFs; the speech corpus will be re-labeled accordingly to obtain a second prosody labeled speech corpus 507. In this moment, the sub-models influenced by the SR (referring to the break-syntax sub-model 1041, the prosodic state sub-model 1042, the syllable prosodic-acoustic feature sub-model 1043, and the break-acoustic sub-model 1044 in FIG. 1(*b*)) will be re-trained according to the PPh-based ISRs, and then the Re-trained SR-HPM 508 will be obtained. Finally, a PPh ISR prediction module 510 is built-up and trained by the training PPh ISR prediction module 509. The PPh ISR prediction module 510 has a neural network 5101 (referring to FIG. 5(*b*)), and provides a predicting feature required by generating predicted value of local ISR/PPh-based ISR (referring to FIG. 6).

As above-mentioned, the present invention provides a method of generating an estimated value of a local inverse speaking rate (ISR) in the training phase, the method includes: providing plural linguistic features corresponding to plural utterances, plural raw utterance-based ISRs, and plural observed prosodic-acoustic features (PAFs) to train a baseline speaking rate-dependent hierarchical prosodic module (referring to FIG. 1(*a*), SR-HPM) and to label each the utterance in an initial speech corpus 301/501 (referring to FIG. 3 and FIG. 5(*a*)) including the plural utterances with a prosodic tag having a break type and a prosodic state to obtain a first prosody-labeled speech corpus 303/503 (referring to FIG. 3 and FIG. 5(*a*)); based on a condition of maximum a posteriori (MAP), according to respective sequences of a syllable duration, a syllable tone, a base-syllable type, and a break type of the $k^{th}$ utterance, a maximum probability of an ISR of the $k^{th}$ utterance $x_k$ is used to estimate an estimated value $\hat{x}_k$ (referring to FIG. 4, 401) of the $x_k$; through the MAP condition, according to respective sequences of a syllable duration, a syllable tone, a base-syllable type, and a break type of the $l^{th}$ breath group/prosodic phrase group (BG/PG) of the $k^{th}$ utterance, a probability of an ISR of the $l^{th}$ BG/PG of the e utterance $x_{k,l}$ to estimate an estimated value $\hat{x}_{k,l}$ (referring to FIG. 4, 402) of the $x_{k,l}$ wherein the $\hat{x}_{k,l}$ is the estimated value of local ISR, and a mean of a prior probability model of the $\hat{x}_{k,l}$ is the $\hat{x}_k$ (referring to FIG. 4); and through the MAP condition, according to respective sequences of a syllable duration, a syllable tone, a base-syllable type, and a break type of the $m^{th}$ prosodic phrase (PPh) of the $l^{th}$ BG/PG of the $k^{th}$ utterance, a probability of an ISR of the $m^{th}$ PPh of the $l^{th}$ BG/PG of the $k^{th}$ utterance $x_{k,l,m}$ is used to estimate an estimated value $\hat{x}_{k,l,m}$ (referring to FIG. 4, 403) of the $x_{k,l,m}$, wherein the $\hat{x}_{k,l,m}$ is the estimated value of local ISR, and a mean of a prior probability model of the $\hat{x}_{k,l,m}$ is the $\hat{x}_{k,l}$ (referring to FIG. 4).

In the method of generating an estimated value of the ISR above, the prior probability model of the $\hat{x}_{k,l}$ and the prior probability model of the $\hat{x}_{k,l,m}$ are a first Gaussian distribution and a second Gaussian distribution respectively. The baseline SR-HPM 304/504 includes speaking rate normalization functions (NFs) 103 and five main prosodic sub-models 104 (referring to FIG. 1(*a*)). The step of training the baseline SR-HPM (referring to FIGS. 1(*a*) and 5(*a*), 504) further includes: constructing the baseline SR-HPM (referring to FIG. 3 and FIG. 5(*a*), 302/502, 304/504) by the PLM algorithm; training the NFs 101 with the plural linguistic features L, the plural observed PAFs A, and the plural raw utterance-based ISRs x; engaging a normalization of the plural observed PAFs by the trained NFs to obtain plural SR normalized PAFs; training the five main prosodic sub-models 102 by the plural SR normalized PAFs A', the plural linguistic features L and the plural raw utterance-based ISRs x; and using the PLM algorithm to label each the utterance in the initial speech corpus 301/501 (referring to FIG. 3 and FIG. 5(*a*)) with the break type and the prosodic state to obtain the prosodic tag T of each the utterance and to produce the first prosody-labeled speech corpus 503.

As shown in FIG. 1(*b*), the five main prosodic sub-models are a break-syntax sub-model, a prosodic state sub-model, a syllable prosodic-acoustic feature sub-model, a break-acoustic sub-model and a prosodic state-syntax sub-model, the break type includes a break type sequence, each one in the break type sequence is selected from a group consisting of a prosodic break at BG/PG boundary, a prosodic break at PPh boundary, a $1^{st}$ type prosodic break with pitch reset at PW boundary, a $2^{nd}$ type prosodic break with short pause at PW boundary, a $3^{rd}$ type prosodic break with syllable duration lengthening at PW boundary, a normal prosodic break within PW, and a prosodic break with tight coupling within PW (referring to FIG. 2), the prosodic state includes a pitch prosodic state sequence, a syllable duration prosodic state sequence and an energy level prosodic state sequence, the prosodic tag T is used to label each the utterance in the initial speech corpus 301/501 (referring to FIG. 3 and FIG. 5(*a*)) with a four-level prosodic structure including four prosodic components of a syllable, a PW, a PPh and a BP/GP to describe the four-level prosodic structure accordingly, and to obtain the first prosody-labeled speech corpus 303/503 (referring to FIG. 3 and FIG. 5(*a*)), the baseline SR-HPM 304/504 (referring to FIG. 3 and FIG. 5(*a*)) is built up by using the plural raw utterance-based ISRs, and that is to say prosodic variations of the whole utterance are assumed to be controlled by the same SR.

A variation of a prior probability model of the first Gaussian distribution is set to be a statistical variance (referring to FIG. 4, 402) of raw BG/PG-based ISRs of plural BG/PG included in C utterances. A selection condition of the C utterances is that the C utterances are the C utterances having the utterance-based ISRs being the closest ones to the $\hat{x}_k$ (referring to FIG. 4, 401) in the first prosody-labeled speech corpus 303/503 (referring to FIG. 3 and FIG. 5(*a*)), and a prior probability model of the second Gaussian distribution is set to be a statistical variance (referring to FIG. 4, 403) of raw PPh-based ISRs of plural PPhs included in D BG/PGs. A selection condition of the D BG/PGs is that the D BG/PGs are the D BG/PGs having the BG/PG-based ISRs being the closest ones to the $\hat{x}_{k,l}$ (referring to FIG. 4, 402) in the first prosody-labeled speech corpus 303/503 (referring to FIG. 3 and FIG. 5(*a*)).

Figure 5B:
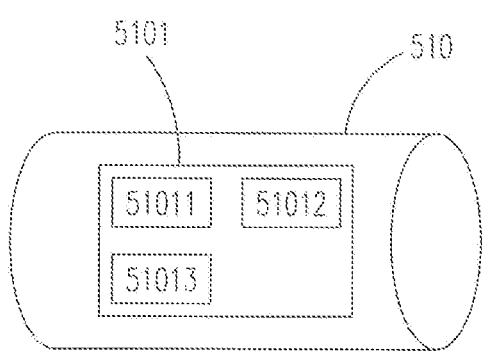
FIG. 5(b) is a schematic diagram of the PPh prediction module as shown in FIG. 5(a).

As shown in FIG. 5(a), in the synthesis phase, via the re-trained SR-HPM 508 and the given utterance-based ISR to engage in prediction of prosodic tag 511, the prediction of local ISR 513 predicts the local ISR via the predicting feature outputted from the PPh ISR prediction module 510 and the predicted prosodic tag, wherein the PPh ISR prediction module 510 uses a regression scheme of a neural network to engage in the training. FIG. 5(b) shows a schematic diagram of the PPh prediction module as shown in FIG. 5(a). As shown in FIG. 5(b), the PPh ISR prediction module 510 includes a neural network 5101, and the neural network 5101 includes a hidden layer 51011, an activation function 51012 and an output layer 51013, wherein the activation function 51012 is a hyperbolic tangent, the output layer 51013 is a node, and the node outputs the predicting feature required by the PPh-based ISR/local ISR. In addition, the input features of the neural network 5101 are an utterance-based ISR (ISR_Utt), a number of syllables in the utterance (#S_Utt), a number of BG/PGs in the utterance (#B_Utt), a number of syllables in the current BG/PG (#S_B), a normalized BG/PG forward position index (Pos_B), a number of PPhs in the current BG/PG (#P_B), a number of syllables in the current PPh (#S_P) and a normalized PPh forward position index (Pos_P), and then uses the re-trained SR-HPM 508 to engage in the prediction of prosodic tag (including break type and prosodic state) 511 and the generation of SR-normalized PAFs 512. Finally, the predicted value of local ISR obtained by the prediction of local ISR 513 is used to denormalize the SR-normalized PAFs, that is to generate the synthesized PAFs, these synthesized PAFs include sp (a syllable pitch contour), sd (syllable duration), se (syllable energy level) and pd (duration of silence between syllables), and these synthesized PAFs manifest prosody with local ISR.

In FIG. 5(a), in the synthesis phase, the method further includes: providing a first feature, linguistic features of a given utterance and a given utterance-based ISR to generate a predicted prosodic tag 511 having a predicted break type and a predicted prosodic state of the given utterance, wherein the first feature is a feature required to generate the predicted prosodic tag, and is provided by the re-trained SR-HPM 508; using the predicting feature and the predicted prosodic tag to generate the predicted value of the local ISR 513; providing a second feature and the predicted prosodic tag 511 to generate a predicted value of an SR-normalized prosodic-acoustic feature (PAF) 512, wherein the second feature is a feature required to generate the predicted value of the SR-normalized PAF 512, and is provided by the re-trained SR-HPM 508; and providing a third feature and the predicted value of the local ISR 513 to denormalize the SR-normalized PAF 514 so as to generate a synthesized PAF, wherein the third feature is a feature required to denormalize the SR-normalized PAF 514, and is provided by the re-trained SR-HPM 508, and the synthesized PAF includes a syllable pitch contour, a syllable duration, a syllable energy level and a duration of silence between syllables.

As shown in FIG. 5(a), a method of generating a predicted value of the local ISR includes: labeling each the utterance in the first prosody-labeled speech corpus 503 by an estimated prosodic tag having an estimated break type and an estimated prosodic state according to each the estimated value of each the local ISR to generate a second prosody-labeled speech corpus 507; receiving each the estimated value of each the local ISR and each the estimated prosodic tag so as to train the baseline SR-HPM 504 into a re-trained SR-HPM 508; providing a first feature, linguistic features of a given utterance, and a given utterance-based ISR to generate a predicted prosodic tag 511 having a predicted break type and a predicted prosodic state; providing a PPh ISR prediction module 510 having a neural network 5101 (referring to FIG. 5(b)); causing the PPh ISR prediction module 510 to receive plural input features and each the estimated value of each the local ISR, using the neural network 5101 to train the PPh ISR prediction module 509, outputting a predicting feature required by generating the predicted value of the local ISR via the PPh ISR prediction module 510; and using the predicting feature and the predicted prosodic tag to generate the predicted value of the local ISR 513.

The method shown in FIG. 5(a) further includes: generating a predicted value of the SR-normalized PAF 512 via the predicted prosodic tag and a second feature; and denormalizing the predicted value of the SR-normalized PAF 514 via a third feature and the predicted value of the local ISR to generate a synthesized PAF, wherein the first feature, the second feature and the third feature are the features respectively required to generate the predicted prosodic tag, to generate the predicted value of the SR-normalized PAF, and to denormalize the predicted value of the SR-normalized PAF, the first to the third features are provided by the re-trained SR-HPM 508, and the synthesized PAF includes a syllable pitch contour, a syllable duration, a syllable energy level and a duration of silence between syllables.

As shown in FIGS. 3, 4 and 5(a), a method of generating an estimated value of local inverse speaking rate (ISR) includes: providing an initial speech corpus 301/501 (referring to FIGS. 3 and 5(a)) including plural utterances; based on a condition of maximum a posteriori (MAP), according to respective sequences of a syllable duration, a syllable tone, a base-syllable type, and a break type of the given $k^{th}$ utterance, using a probability of an ISR of the $k^{th}$ utterance $x_k$ to estimate an estimated value $\hat{x}_k$ (referring to FIG. 4, 401) of the $x_k$; and through the MAP condition, according to respective sequences of a syllable duration, a syllable tone, a base-syllable type, and a break type of the $l^{th}$ breath group/prosodic phrase group (BG/PG) of the given $k^{th}$ utterance, using a probability of an ISR of the $l^{th}$ BG/PG of the $k^{th}$ utterance $x_{k,l}$ to estimate an estimated value $\hat{x}_{k,l}$ (referring to FIG. 4, 402) of the $x_{k,l}$, wherein the $\hat{x}_{k,l}$ is the estimated value of local ISR, and a mean of a prior probability model of the $\hat{x}_{k,l}$ is the $\hat{x}_k$.

As shown in FIGS. 3, 4 and 5(a), the method further includes: through the MAP condition, according to respective sequences of a syllable duration, a syllable tone, a base-syllable type, and a break type of the $m^{th}$ prosodic phrase (PPh) of the $l^{th}$ BG/PG of the given $k^{th}$ utterance, using a probability of an ISR of the $m^{th}$ PPh of the $l^{th}$ BG/PG of the $k^{th}$ utterance $x_{k,l,m}$ to estimate an estimated value $\hat{x}_{k,l,m}$ of the $x_{k,l,m}$, the estimated value of local ISR is reset as $\hat{x}_{k,l,m}$, wherein a mean of a prior probability model of the $\hat{x}_{k,l,m}$ is the $\hat{x}_{k,l}$, the prior probability model of the $\hat{x}_{k,l}$ and the prior probability model of the $\hat{x}_{k,l,m}$ are a first Gaussian distribution and a second Gaussian distribution respectively, and the providing an initial speech corpus 301/501 (referring to FIG. 3 and FIG. 5(a)) including plural utterances step further includes: providing plural linguistic features corresponding to the plural utterances, plural raw utterance-based ISRs, and plural observed prosodic-acoustic features (PAFs) to train a baseline speaking rate-dependent hierarchical prosodic module (SR-HPM) 304/504 (referring to FIG. 3 and FIG. 5(a)) and to label each the utterance in an initial speech corpus 301/501 (FIG. 3 and FIG. 5(a)) including the plural utterances with a prosodic tag having a break type and a prosodic state to obtain a first prosody-labeled speech corpus 303/503 (FIG. 3 and FIG. 5(a)).

Figure 6:
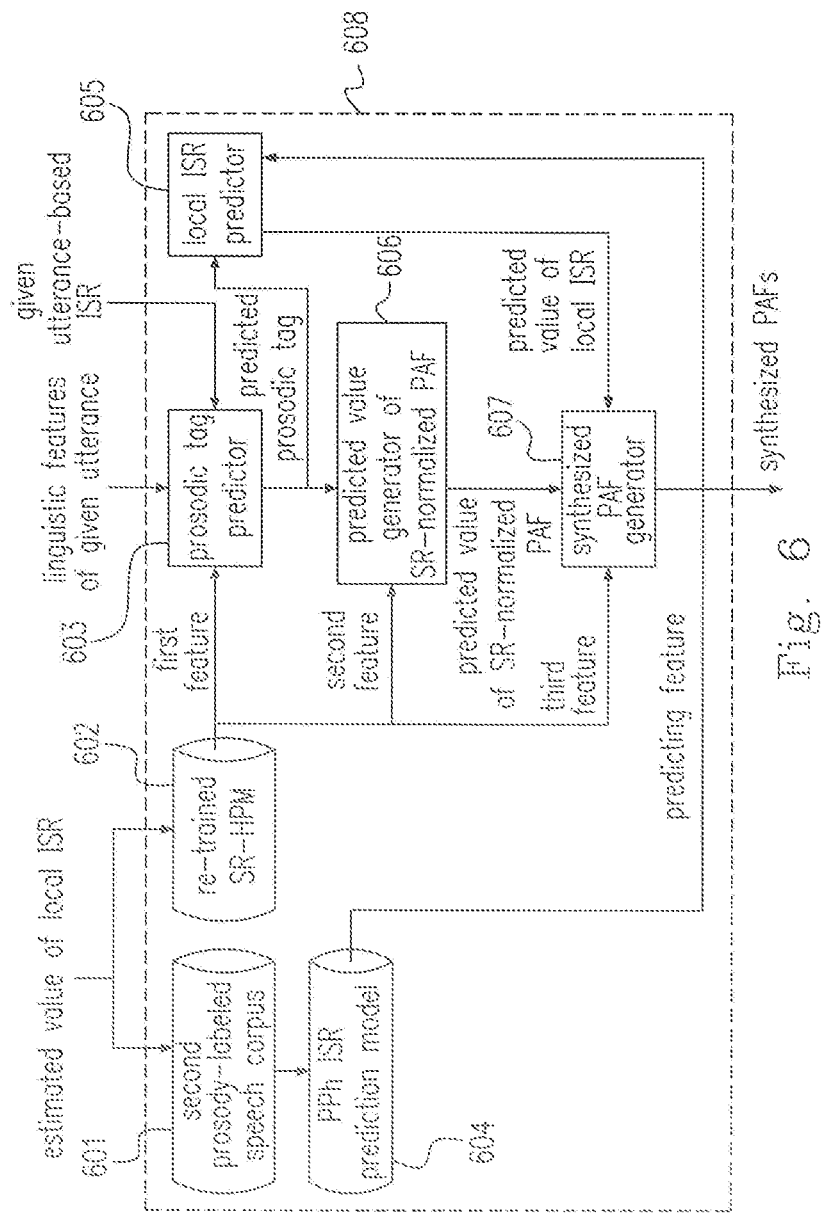
FIG. 6 is a schematic diagram of an apparatus generating a predicted value of the local ISR according to the preferred embodiment of the present invention.

FIG. 6 shows a schematic diagram of an apparatus generating a predicted value of the local ISR according to the preferred embodiment of the present invention. As shown in FIG. 6, the apparatus 608 generating a predicted value of the local ISR includes: a second prosody-labeled speech corpus 601, a re-trained SR-HPM 602, a prosodic tag predictor 603, a PPh ISR prediction module 604, a local ISR predictor 605, a predicted value generator of an SR-normalized PAF 606 and synthesized PAF generator 607.

As shown in FIGS. 3, 5(a) and 6, the apparatus 608 generating a predicted value of the local ISR includes a second prosody-labeled speech corpus 601 obtained by labeling each the utterance in the first prosody-labeled speech corpus 303/503 (referring to FIG. 3 and FIG. 5(a)) by an estimated prosodic tag having an estimated break type and an estimated prosodic state according to the estimated value of the local ISR; a re-trained SR-HPM 602 receiving each the estimated value of each the local ISR and each the estimated prosodic tag, and obtained by re-training the baseline SR-HPM 304/504 (referring to FIG. 3 and FIG. 5(a)) accordingly; a prosodic tag predictor 603 receiving a first feature, a given utterance-based ISR and linguistic features of a given utterance to generate a predicted prosodic tag having a predicted break type and a predicted prosodic state; a PPh ISR prediction module 510/604 (referring to FIG. 5(a) and FIG. 6) receiving plural input features (referring to FIG. 5(b), 5101) and each the estimated value of each the local ISR, having a neural network (referring to FIG. 5(b), 5101), using the neural network 5101 to train the PPh ISR prediction module 510/604 (referring to FIG. 5(a) and FIG. 6), and outputting a predicting feature required by generating the predicted value of the local ISR; and a local ISR predictor 605 receiving the predicting feature and the predicted prosodic tag to generate the predicted value of the local ISR.

In FIG. 6, the apparatus 608 generating a predicted value of the local ISR further includes a predicted value generator of an SR-normalized PAF 606 and a synthesized PAF generator 607, wherein the predicted value generator of the SR-normalized PAF 606 receives the predicted prosodic tag and a second feature to generate a predicted value of the SR-normalized PAF, and the synthesized PAF generator 607 receives the predicted value of the local ISR, the predicted value of the SR-normalized PAF and a third feature, and denormalizes the predicted value of the SR-normalized PAF to generate a synthesized PAF, the first feature, the second feature and the third feature are the features respectively required to generate the predicted prosodic tag, to generate the predicted value of the SR-normalized PAF, and to denormalize the predicted value of the SR-normalized PAF, the first to the third features are provided by the re-trained SR-HPM 602, the neural network 5101 has a hidden layer 51011, an activation function 51012 and an output layer 51013, the PPh ISR prediction module 604 is trained by using a regression scheme of the neural network 5101, and the plural input features include an utterance-based ISR (ISR_Utt), a number of syllables in the utterance (#S_Utt), a number of BG/PGs in the utterance (#B_Utt), a number of syllables in the current BG/PG (#S_B), a normalized BG/PG forward position index (Pos_B), a number of PPhs in the current BG/PG (#P_B), a number of syllables in the current PPh (#S_P) and a normalized PPh forward position index (Pos_P), wherein the activation function is a hyperbolic tangent, the output layer is a node, and the normalized forward position index is defined as $(l-1)/(L-1)$, where L represents the number of BG/PGs in the utterance, and l represents the forward position of BG/PG.

In the present invention, several prosody generation experiments are conducted to verify that the estimated local ISRs are meaningful and could accurately describe the speaker's speaking rate variations. Two experiments are designed: an oracle one and a real one. Regarding the prosody generation of the oracle prosody generation experiment, the correct break type sequence is given, then the PAFs are generated, and this sequence is the break type sequence generated by the given trained SR-HPM. In other words, the correct prosodic structure is given, and then the PAFs are synthesized. The PAFs of the real prosody generation experiment are predicted through the real and entire prosody generation procedure, wherein the break type sequence is generated by the break type and prosodic state prediction or the prediction of prosodic tag 511 (referring to FIG. 5(a)), and the PAFs are further generated by the features previously obtained.

The purpose of the oracle experiment is to examine if the estimated local ISR could accurately model the prosodic variations in terms of the objective measures. The objective measures used here are the root-mean-square error (RMSE) and the correlation coefficients calculated with the true and generated PAFs. We compare the performances of the utterance-based, BG/PG-based and the PPh-based ISR estimations, and the associated estimation methods: RAW, EM, and EM-MAP. The RAW method is to simply estimate the ISR by averaging syllable durations of a prosodic unit. The EMMAP method estimates the local ISR by Eq. (6) and Eq. (14), while the EM method estimates the local ISR by Eq. (6) and Eq. (14) without the prior probability p(x). It can be seen from Table 1(a) that regarding the generation of PAFs, estimation with EM-MAP yielded the lowest RMSEs and the highest correlation coefficient than with EM and with RAW in general. Especially, the PPh-based ISR obtained by the EM-MAP possesses the lowest RMSE and the highest correlation coefficient for sd (syllable duration) and sp (syllable pitch contour).

Table 1(b) shows the RMSE and correlation coefficient between the PAFs predicted by the real prosody generation experiments and the true PAFs. We compare the results by the three configurations of real prosody generation: UTT-based RAW, UTT-based EM, and PPh-based EM-MAP. The prediction results by the UTT-based RAW configuration are obtained by the PAFs generated by the baseline SR-HPM with the raw utterance-based ISR. The UTT-based EM results are obtained by the utterance-based ISR estimated by Eq. (1) and the PAFs generates by the re-trained SR-HPM with linguistic features and the utterance-based EM-estimated ISR. The PAF prediction of the PPh-based EM-MAP results are obtained by using the re-trained SR-HPM with the PPh-based ISR estimated by Eq. (14) and the local ISR predictor with the PPh-based ISR generated by the PPh-based prediction module. As shown in Table 1(b), PPh-based EM-MAP has the best performance. An informal listening test confirmed that the synthesized speech of the new method using PPh-based ISR estimates is more vivid than that of the existing SR-HPM method using a given utterance-based ISR.

Table 2 shows the prediction results of the PPh ISR prediction module, uses this structure to predict BG/PG-based ISR, and tests the influences of various prosodic related features towards the SR estimation of the local ISR, wherein NN is a neural network, and the total residual error (TRE) includes two items of training and test. Results show that adding the number of syllables included in local ISR predictor unit can surely help the prediction of the SR, mainly because usually the faster the local ISR predictor is, the more syllables are included, and the slower the local ISR predictor is, the fewer syllables are included. This explains that the number of syllables included in the local ISR predictor is related to the SR, the prosody is influenced by the SR also, and thus using the prosodic related features can indeed assist the estimation of the SR.

of combining the prosodic structure to provide a reasonable estimation range of SR in the conventional ISR estimation method, and to provide a clean ISR estimation without being influenced by the text and prosodic structure to solve the problem that the ISR estimation is easily influenced by the bias caused by the SR influence factors so as to allow the estimation of the ISR to be more accurate to model prosody variety in speech, and the ISR estimation can be used in the

TABLE 1

RMSEs and correlation coefficients between the predicted and true PAFs under the conditions of (a) with correct break and correct local ISR, and (b) with predicted break and predicted local ISR.

(a)

| | | UTT-based[a] | | BG/PG-based[b] | | | PPh-based[c] | | |
|---|---|---|---|---|---|---|---|---|---|
| | | RAW[d] | EM[e] | RAW | EM | EM-MAP[f] | RAW | EM | EM-MAP |
| RMSE | sd[g] | 48.2 | 47.7 | 47.7 | 48.3 | 47.2 | 48.0 | 46.2 | 45.4 |
| | sp[h] | .1472 | .1467 | .1650 | .1469 | .1469 | .1472 | .1465 | .1463 |
| | se[i] | 3.54 | 3.53 | 3.56 | 3.56 | 3.52 | 3.57 | 3.55 | 3.56 |
| | pd[j] | 55.2 | 55.2 | 58.2 | 56.8 | 55.5 | 61.9 | 60.6 | 59.6 |
| COR[k] | sd | .779 | .784 | .783 | .784 | .790 | .786 | .802 | .810 |
| | sp[l] | .776 | .776 | .775 | .774 | .776 | .773 | .780 | .779 |
| | | .815 | .814 | .815 | .815 | .816 | .815 | .815 | .816 |
| | | .631 | .631 | .634 | .631 | .632 | .633 | .633 | .632 |
| | | .524 | .524 | .524 | .524 | .527 | .526 | .525 | .527 |
| | se | .887 | .888 | .887 | .887 | .890 | .887 | .887 | .887 |
| | pd | .954 | .954 | .948 | .951 | .954 | .941 | .943 | .945 |

(b)

| | RMSE | | | | COR | | | |
|---|---|---|---|---|---|---|---|---|
| | sd | sp | se | pd | sd | sp[m] | se | pd |
| UTT-based RAW | 49.1 | .1597 | 3.63 | 88.2 | .770 | [.727 .774 .600 .494] | .881 | .881 |
| UTT-based EM | 48.8 | .1580 | 3.63 | 87.4 | .773 | [.731 .773 .602 .501] | .882 | .881 |
| PPh-based EM-MAP | 48.0 | .1578 | 3.63 | 87.6 | .783 | [.734 .775 .602 .498] | .883 | .880 |

[a]UTT-based: SR-HPM with utterance-based ISR.
[b]BG/PG-based: SR-HPM trained with BG/PG-based ISR.
[c]PPh-based: SR-HPM trained with PPh-based ISR.
[d]RAW: Raw ISR obtained by simply averaging syllable duration.
[e]EM: ISR estimated with EM algorithm without the prior $p_{(x)}$.
[f]EM-MAP: ISR estimated by the EM algorithm with MAP criterion.
[g]sd: second,
[h]sp: logHz,
[i]se: dB,
[j]pd: second
[k]COR: correlation coefficient
[l]sp: CORs of four-dimensional logF0 contour

TABLE 2 the total residual errors (TRE) of the predicted BG/PG and PPh ISR

| | ISR_Utt # B_Utt Pos_B | # S_Utt | # S_B | # P_B Pos_P | # S_P | TREs Training/ Test |
|---|---|---|---|---|---|---|
| BG/PG | v | | | | | 1.09/1.20 |
| NN | v | v | | | | 1.12/1.24 |
| | v | | v | | | 1.14/1.18 |
| | v | v | v | | | 1.02/1.14 |
| PPh | v | v | v | v | | 0.93/0.98 |
| NN | v | v | v | v | v | 0.89/0.94 |

According to the aforementioned descriptions, the present invention discloses an estimation method of ISR using a hierarchical structure to combine a prosodic model with a prosodic structure to solve the problem of the inability to estimate local ISR of a small region due to the incapability areas of Speech Synthesis, Speech Recognition, and Natural Language Processing as training features, or used in analytical applications, and thus has non-obviousness and novelty.

While the invention has been described in terms of what is presently considered to be the most practical and preferred embodiments, it is to be understood that the invention need not be limited to the disclosed embodiments. Therefore, it is intended to cover various modifications and similar configurations included within the spirit and scope of the appended claims, which are to be accorded with the broadest interpretation so as to encompass all such modifications and similar structures.

What is claimed is:

1. A method of generating an estimated value of a local inverse speaking rate (ISR), comprising:
providing an initial speech corpus including plural utterances, a baseline speaking rate-dependent hierarchical prosodic module (SR-HPM), plural linguistic features corresponding to the plural utterances, plural raw utterance-based ISRs, and plural observed prosodic-acoustic features (PAFs) to train the baseline SR-HPM and to label each the utterance in the initial speech corpus with a prosodic tag having a break type and a prosodic state to obtain a first prosody labeled speech corpus;

based on a condition of maximum a posteriori (MAP), according to respective sequences of a syllable duration, a syllable tone, a base-syllable type, and a break type of the $k^{th}$ one of the plural utterances, using a probability of a first ISR of the $k^{th}$ utterance $x_k$ to estimate an estimated value $\hat{x}_k$ of the $x_k$;

through the MAP condition, according to respective sequences of a syllable duration, a syllable tone, a base-syllable type, and a break type of an $l^{th}$ breath group/prosodic phrase group (BG/PG) of the $k^{th}$ utterance, using a probability $x_{k,l}$ of a second ISR of the $l^{th}$ BG/PG of the $k^{th}$ utterance to estimate an estimated value $\hat{x}_{k,l}$ of the $x_{k,l}$, wherein the $\hat{x}_{k,l}$ is the estimated value of the local ISR, and a prior probability model of the $\hat{x}_{k,l}$ has a mean being the $\hat{x}_k$; and through the MAP condition, according to respective sequences of a syllable duration, a syllable tone, a base-syllable type, and a break type of an $m^{th}$ prosodic phrase (PPh) of the $l^{th}$ BG/PG of the $k^{th}$ utterance, using a probability of a third ISR of the $m^{th}$ PPh of the $l^{th}$ BG/PG of the $k^{th}$ utterance $x_{k,l,m}$ to estimate an estimated value $\hat{x}_{k,l,m}$ of the $x_{k,l,m}$, wherein the $\hat{x}_{k,l,m}$ is the estimated value of the local ISR, and a prior probability model of the $\hat{x}_{k,l,m}$ has a mean being the $\hat{x}_{k,l}$.

2. The method according to claim 1, wherein the prior probability model of the $\hat{x}_{k,l}$ and the prior probability model of the $\hat{x}_{k,l,m}$ are a first Gaussian distribution and a second Gaussian distribution respectively, the baseline SR-HPM includes speaking rate (SR) normalization functions (NFs) and five prosodic main sub-models, and the step of training the baseline SR-HPM further includes:

constructing the baseline SR-HPM by a Prosody Labeling and Modeling (PLM) algorithm;

training the NFs with the plural linguistic features, the plural observed PAFs, and the plural raw utterance-based ISRs;

engaging a normalization of the plural observed PAFs by the trained NFs to obtain plural SR normalized PAFs;

training the five prosodic main sub-models by the plural SR normalized PAFs, the plural linguistic features and the plural raw utterance-based ISRs; and using the PLM algorithm to label each the utterance in the initial speech corpus with the break type and the prosodic state to obtain the prosodic tag of each the utterance and to produce the first prosody labeled speech corpus.

3. The method according to claim 2, wherein the five prosodic main sub-models are a syntactic-prosodic sub-model, a prosodic state sub-model, a syllable prosodic-acoustic sub-model, a break-acoustic sub-model and a prosodic state syntactic sub-model, the break type includes a break tag sequence, each one of components in the break tag sequence is selected from a group consisting of a BG/PG boundary prosodic break, a PPh boundary prosodic break, a first type prosodic word (PW) prosodic break with an F0 reset, a second type PW prosodic break with a perceived short pause, a third type PW prosodic break with a pre-boundary syllable duration lengthening, a normal prosodic break within a PW, and a tightly coupled syllable juncture prosodic break within a PW, the prosodic state includes a fundamental frequency prosodic state sequence, a syllable duration prosodic state sequence and an energy level prosodic state sequence, the prosodic tag is used to label each the utterance in the initial speech corpus with a four-level prosodic structure including four prosodic components of a syllable, a PW, a PPh and a BP/GP to describe the four-level prosodic structure accordingly, and to obtain the first prosody labeled speech corpus, the baseline SR-HPM is built up by using the plural raw utterance-based ISRs, and prosodic variations of each of the plural utterances are assumed to be controlled by the same SR.

4. The method according to claim 3, wherein the prior probability model of the first Gaussian distribution has a variation set to be a statistical variance of raw BG/PG-based ISRs of plural BG/PGs included in C utterances, a selection condition of the C utterances is that the C utterances are those C utterances having utterance-based ISRs being the closest ones to the $\hat{x}_k$ in the first prosody labeled speech corpus, and the prior probability model of the second Gaussian distribution has a variation set to be a statistical variance of raw PPh-based ISRs of plural PPhs included in D BG/PGs, a selection condition of the D BG/PGs is that the D BG/PGs are the D BG/PGs having BG/PG-based ISRs being the closest ones to the $\hat{x}_{k,l}$ in the first prosody labeled speech corpus.

5. The method according to claim 4, further comprising:
re-training the baseline SR-HPM with the estimated value of the local ISR to obtain a re-trained SR-HPM, wherein the syntactic-prosodic, the prosodic state, the syllable prosodic-acoustic and the break-acoustic sub-models being all influenced by the SR, and the NFs are re-trained;

according to the estimated value of the local ISR, labeling all the utterances in the first prosody labeled speech corpus by an estimated prosodic tag having an estimated break type and an estimated prosodic state with the PLM algorithm to obtain a second prosody labeled speech corpus; and using the estimated value of the local ISR and the re-trained SR-HPM to construct and train a PPh ISR prediction module, wherein the PPh ISR prediction module provides a predicting feature required by generating a predicted value of a PPh-based ISR, includes a neural network, and uses a regression scheme of the neural network to train the PPh ISR prediction module, the neural network has a hidden layer, an activation function and an output layer, and the neural network has plural input features including an ISR of utterance (ISR_Utt), a syllable number of utterance (#S_Utt), a BG/PG number of utterance (#B_Utt), a syllable number of current BG/PG (#S_B), a forward position of normalized BG/PG (Pos_B), a PPh number of current BG/PG (#P_B), a syllable number of current PPh (#S_P) and a forward position of normalized PPh (Pos_P), wherein the predicted value is a predicted value of the local ISR, the activation function is a hyperbolic tangent, the output layer is a node outputting the predicting feature, and the forward position is defined as $(l-1)/(L-1)$, where L is the BG/PG number of utterance, and l is the forward position of BG/PG.

6. The method according to claim 5, further comprising:
providing a first feature, linguistic features of a given utterance and a given utterance-based ISR to generate a predicted prosodic tag having a predicted break type and a predicted prosodic state of the given utterance, wherein the first feature is a feature required to generate the predicted prosodic tag, and is provided by the re-trained SR-HPM;

using the predicting feature and the predicted prosodic tag to generate the predicted value of the local ISR;

providing a second feature and the predicted prosodic tag to generate a predicted value of an SR-normalized prosodic-acoustic feature (PAF), wherein the second feature is a feature required to generate the predicted value of the SR-normalized PAF, and is provided by the re-trained SR-HPM; and providing a third feature and the predicted value of the local ISR to denormalize the SR-normalized PAF so as to generate a synthesized PAF, wherein the third feature is a feature required to denormalize the SR-normalized PAF, and is provided by the re-trained SR-HPM, and the synthesized PAF includes a syllable pitch contour, a syllable duration, a syllable energy level and a duration of silence between syllables.

7. An apparatus using the method according to claim 1 to generate a predicted value of the local ISR, comprising:

a second prosody labeled speech corpus obtained from labeling each the utterance in the first prosody labeled speech corpus by an estimated prosodic tag having an estimated break type and an estimated prosodic state according to the estimated value of the local ISR;

a re-trained SR-HPM receiving each the estimated value of each the local ISR and each the estimated prosodic tag, and obtained by re-training the baseline SR-HPM accordingly;

a prosodic tag predictor receiving a first feature, a given utterance-based ISR and linguistic features of a given utterance to generate a predicted prosodic tag having a predicted break type and a predicted prosodic state;

a PPh ISR prediction module receiving plural input features and each the estimated value of each the local ISR, having a neural network, using the neural network to train the PPh ISR prediction module, and outputting a predicting feature required by generating the predicted value of the local ISR; and a local ISR predictor receiving the predicting feature and the predicted prosodic tag to generate the predicted value of the local ISR.

8. The apparatus according to claim 7, further comprising a predicted value generator of an SR-normalized PAF and a synthesized PAF generator, wherein the predicted value generator of the SR-normalized PAF receives the predicted prosodic tag and a second feature to generate a predicted value of the SR-normalized PAF, and the synthesized PAF generator receives the predicted value of the local ISR, the predicted value of the SR-normalized PAF and a third feature, and denormalizes the predicted value of the SR-normalized PAF to generate a synthesized PAF, the first feature, the second feature and the third feature are respectively required to generate the predicted prosodic tag, to generate the predicted value of the SR-normalized PAF, and to denormalize the predicted value of the SR-normalized PAF, the first to the third features are provided by the re-trained SR-HPM, the neural network has a hidden layer, an activation function and an output layer, the PPh ISR prediction module is trained by using a regression scheme of the neural network, and the neural network has plural input features including an ISR of utterance (ISR_Utt), a syllable number of utterance (#S_Utt), a BG/PG number of utterance (#B_Utt), a syllable number of current BG/PG (#S_B), a forward position of normalized BG/PG (Pos_B), a PPh number of current BG/PG (#P_B), a syllable number of current PPh (#S_P) and a forward position of normalized PPh (Pos_P), wherein the activation function is a hyperbolic tangent, the output layer is a node, and the forward position is defined as (l−1)/(L−1), where L is the BG/PG number of utterance, and l is the forward position of BG/PG.

9. A method using the method according to claim 1 to generate a predicted value of the local ISR, comprising:

labeling each the utterance in the first prosody labeled speech corpus by an estimated prosodic tag having an estimated break type and an estimated prosodic state according to each the estimated value of each the local ISR to generate a second prosody labeled speech corpus;

receiving each the estimated value of each the local ISR and each the estimated prosodic tag so as to train the baseline SR-HPM into a re-trained SR-HPM;

providing a first feature, linguistic features of a given utterance, and a given utterance-based ISR to generate a predicted prosodic tag having a predicted break type and a predicted prosodic state;

providing a PPh ISR prediction module having a neural network;

causing the PPh ISR prediction module to receive plural input features and each the estimated value of each the local ISR, using the neural network to train the PPh ISR prediction module, and outputting a predicting feature required by generating the predicted value of the local ISR; and using the predicting feature and the predicted prosodic tag to generate the predicted value of the local ISR.

10. The method according to claim 9, further comprising:

generating a predicted value of the SR-normalized PAF via the predicted prosodic tag and a second feature; and denormalizing the predicted value of the SR-normalized PAF via a third feature and the predicted value of the local ISR to generate a synthesized PAF, wherein the first feature, the second feature and the third feature are respectively required to generate the predicted prosodic tag, to generate the predicted value of the SR-normalized PAF, and to denormalize the predicted value of the SR-normalized PAF, the first to the third features are provided by the re-trained SR-HPM, and the synthesized PAF includes a syllable pitch contour, a syllable duration, a syllable energy level and a duration of silence between syllables.

11. A method of generating an estimated value of a local inverse speaking rate (ISR), comprising:

providing an initial speech corpus including plural utterances;

based on a condition of maximum a posteriori (MAP), according to respective sequences of a syllable duration, a syllable tone, a base-syllable type, and a break type of the $k^{th}$ one of the plural utterances, using a probability of a first ISR of the $k^{th}$ utterance $x_k$ to estimate an estimated value $\hat{x}_k$ of the $x_k$;

through the MAP condition, according to respective sequences of a syllable duration, a syllable tone, a base-syllable type, and a break type of the $l^{th}$ breath group/prosodic phrase group (BG/PG) of the $k^{th}$ utterance, using a probability of a second ISR of the $l^{th}$ BG/PG of the $k^{th}$ utterance $x_{k,l}$ to estimate an estimated value $\hat{x}_{k,l}$ of the $x_{k,l}$, wherein the $\hat{x}_{k,l}$ is the estimated value of the local ISR, and a prior probability model of the $\hat{x}_{k,l}$ has a mean being the $\hat{x}_k$; and through the MAP condition, according to respective sequences of a syllable duration, a syllable tone, a base-syllable type, and a break type of the $m^{th}$ prosodic phrase (PPh) of the $l^{th}$ BG/PG of the $k^{th}$ utterance, using a probability of a third ISR of the $m^{th}$ PPh of the $l^{th}$ BG/PG of the $k^{th}$ utterance $x_{k,l,m}$ to estimate an estimated value $\hat{x}_{k,l,m}$ of the $x_{k,l,m}$, wherein the $\hat{x}_{k,l,m}$ is the estimated value of the local ISR, and a prior probability model of the $\hat{x}_{k,l,m}$ has a mean being the $\hat{x}_{k,l}$.

12. The method according to claim 11, wherein the prior probability model of the $\hat{x}_{k,l}$ and the prior probability model of the $\hat{x}_{k,l,m}$ are a first Gaussian distribution and a second Gaussian distribution respectively, the step of providing the initial speech corpus including plural utterances further comprises providing plural linguistic features corresponding to plural utterances, plural raw utterance-based ISRs, and plural observed prosodic-acoustic features (PAFs) to train a baseline speaking rate-dependent hierarchical prosodic module (SR-HPM) and to label each the utterance in the initial speech corpus including the plural utterances with a prosodic tag having a break type and a prosodic state to obtain a first prosody labeled speech corpus, the baseline SR-HPM includes speaking rate (SR) normalization function (NFs) and five prosodic main sub-models, and the step of training the baseline SR-HPM further includes:
  constructing the baseline SR-HPM by a Prosody Labeling and Modeling (PLM) algorithm;
  training the NFs with the plural linguistic features, the plural observed PAFs, and the plural raw utterance-based ISRs;
  engaging a normalization of the plural observed PAFs by the trained NFs to obtain plural SR-normalized PAFs;
  training the five prosodic main sub-models by the plural SR-normalized PAFs, the plural linguistic features and the plural raw utterance-based ISRs; and
  using the PLM algorithm to label each the utterance in the initial speech corpus with the break type and the prosodic state to obtain the prosodic tag of each the utterance and to produce the first prosody labeled speech corpus.

13. The method according to claim 12, wherein the five prosodic main sub-models are a syntactic-prosodic sub-model, a prosodic state sub-model, a syllable prosodic-acoustic sub-model, a break-acoustic sub-model and a prosodic state syntactic sub-model, the break type includes a break tag sequence, each one of components in the break tag sequence is selected from a group consisting of a BG/PG boundary prosodic break, a PPh boundary prosodic break, a first type PW prosodic break with an F0 reset, a second type PW prosodic break with a perceived short pause, a third type PW prosodic break with a preboundary syllable duration lengthening, a normal prosodic break within a PW, and a tightly coupled syllable juncture prosodic break within a PW, the prosodic state includes a pitch prosodic state sequence, a syllable duration prosodic state sequence and an energy level prosodic state sequence, the prosodic tag is used to label each the utterance in the initial speech corpus with a four-level prosodic structure including four prosodic components of a syllable, a PW, a PPh and a BP/GP to describe the four-level prosodic structure accordingly, and to obtain the first prosody labeled speech corpus, the baseline SR-HPM is built up by using the plural raw utterance-based ISRs, and prosodic variations of the whole utterance are assumed to be controlled by the same SR.

14. The method according to claim 13, wherein the prior probability model of the first Gaussian distribution has a variation set to be a statistical variance of raw BG/PG-based ISRs of plural BG/PG included in C utterances, a selection condition of the C utterances is that the C utterances are those C utterances having the utterance-based ISRs being the most closest ones to the $\hat{x}_k$ in the first prosody labeled speech corpus, and the prior probability model of the second Gaussian distribution has a variation set to be a statistical variance of raw PPh-based ISRs of plural PPhs included in D BG/PGs, a selection condition of the D BG/PGs is that the D BG/PGs are those having the BG/PG-based ISRs being the closest ones to the $\hat{x}_{k,l}$ in the first prosody labeled speech corpus.

15. The method according to claim 14, further comprising:
  re-training the baseline SR-HPM with the estimated value of the local ISR to obtain a re-trained SR-HPM, wherein the syntactic-prosodic, the prosodic state, the syllable prosodic-acoustic and the break-acoustic sub-models being all influenced by the SR, and the NFs are re-trained;
  according to the estimated value of the local ISR, labeling all the utterances in the first prosody labeled speech corpus by an estimated prosodic tag having an estimated break type and an estimated prosodic state with the PLM algorithm to obtain a second prosody labeled speech corpus; and
  using the estimated value of the local ISR and the re-trained SR-HPM to construct and train a PPh ISR prediction module, wherein the PPh ISR prediction module provides a predicting feature required by generating a predicted value of a PPh-based ISR, includes a neural network, and uses a regression scheme of the neural network to train the PPh ISR prediction module, the neural network has a hidden layer, an activation function and an output layer, and the neural network has plural input features including an ISR of utterance (ISR_Utt), a syllable number of utterance (#S_Utt), a BG/PG number of utterance (#B_Utt), a syllable number of current BG/PG (#S_B), a forward position of normalized BG/PG (Pos_B), a PPh number of current BG/PG (#P_B), a syllable number of current PPh (#S_P) and a forward position of normalized PPh (Pos_P), wherein the predicted value is a predicted value of the local ISR, the activation function is a hyperbolic tangent, the output layer is a node outputting the predicting feature, and the forward position is defined as $(l-1)/(L-1)$, where L is the BG/PG number of utterance, and l is the forward position of BG/PG.

16. The method according to claim 15, further comprising:
  providing a first feature, linguistic features of a given utterance and a given utterance-based ISR to generate a predicted prosodic tag having a predicted break type and a predicted prosodic state of the given utterance, wherein the first feature is required to generate the predicted prosodic tag, and is provided by the re-trained SR-HPM;
  using the predicting feature and the predicted prosodic tag to generate the predicted value of the local ISR;
  providing a second feature and the predicted prosodic tag to generate a predicted value of an SR-normalized prosodic-acoustic feature (PAF), wherein the second feature is required to generate the predicted value of the SR normalized PAF, and is provided by the re-trained SR-HPM; and
  providing a third feature and the predicted value of the local ISR to denormalize the SR normalized PAF so as to generate a synthesized PAF, wherein the third feature is required to denormalize the SR normalized PAF, and is provided by the re-trained SR-HPM, and the synthesized PAF includes a syllable pitch contour, a syllable duration, a syllable energy level and a duration of silence between syllables.

17. A method of generating an estimated value of a local inverse speaking rate (ISR), comprising:
providing an initial speech corpus including plural utterances;
based on a condition of maximum a posteriori (MAP), according to respective sequences of a syllable duration, a syllable tone, a base-syllable type, and a break type of the $k^{th}$ one of the plural utterances, using a probability of a first ISR $x_k$ of the $k^{th}$ one of the plural utterances to estimate an estimated value $\hat{x}_k$ of the $x_k$; and
through the MAP condition, according to respective sequences of a syllable duration, a syllable tone, a base-syllable type, and a break type of the $l^{th}$ breath group/prosodic phrase group (BG/PG) of the $k^{th}$ utterance, using a probability of a second ISR of the $l^{th}$ BG/PG of the $k^{th}$ utterance $x_{k,l}$ to estimate an estimated value $\hat{x}_{k,l}$ of the $x_{k,l}$, wherein the $\hat{x}_{k,l}$ is the estimated value of the local ISR, and a prior probability model of the $\hat{x}_{k,l}$ has a mean being the $\hat{x}_k$.

18. The method according to claim 17, further comprising through the MAP condition, according to respective sequences of a syllable duration, a syllable tone, a base-syllable type, and a break type of the $m^{th}$ prosodic phrase (PPh) of the $l^{th}$ BG/PG of the $k^{th}$ utterance, using a probability of a third ISR of the $m^{th}$ PPh of the $l^{th}$ BG/PG of the $k^{th}$ utterance $x_{k,l,m}$ to estimate an estimated value $\hat{x}_{k,l,m}$ of the $x_{k,l,m}$, the estimated value of the local ISR is reset as $\hat{x}_{k,l,m}$, wherein a prior probability model of the $\hat{x}_{k,l,m}$ has a mean being the $\hat{x}_{k,l}$, the prior probability model of the $\hat{x}_{k,l}$ and the prior probability model of the $\hat{x}_{k,l,m}$ are a first Gaussian distribution and a second Gaussian distribution respectively, and the providing an initial speech corpus including plural utterances step further comprises providing plural linguistic features corresponding to plural utterances, plural raw utterance-based ISRs, and plural observed prosodic-acoustic features (PAFs) to train a baseline speaking rate-dependent hierarchical prosodic module (SR-HPM) and to label each the utterance in an initial speech corpus including the plural utterances with a prosodic tag having a break type and a prosodic state to obtain a first prosody labeled speech corpus.

* * * * *